United States Patent
Chin et al.

(10) Patent No.: US 8,861,515 B2
(45) Date of Patent: Oct. 14, 2014

(54) METHOD AND APPARATUS FOR SHARED MULTI-BANK MEMORY IN A PACKET SWITCHING SYSTEM

(75) Inventors: Chung Kuang Chin, Saratoga, CA (US); Yaw Fann, Santa Clara, CA (US); Roy T. Myers, Jr., Santa Clara, CA (US)

(73) Assignee: Agere Systems LLC, Allentown, PA (US)

( * ) Notice: Subject to any disclaimer, the term of this patent is extended or adjusted under 35 U.S.C. 154(b) by 822 days.

(21) Appl. No.: 10/552,601

(22) PCT Filed: Apr. 21, 2004

(86) PCT No.: PCT/US2004/012305
§ 371 (c)(1),
(2), (4) Date: Oct. 5, 2005

(87) PCT Pub. No.: WO2004/095286
PCT Pub. Date: Nov. 4, 2004

(65) Prior Publication Data
US 2006/0221945 A1  Oct. 5, 2006

Related U.S. Application Data

(60) Provisional application No. 60/464,462, filed on Apr. 22, 2003.

(51) Int. Cl.
*H04L 12/50* (2006.01)
*H04Q 11/00* (2006.01)
*H04L 12/861* (2013.01)
*H04L 12/933* (2013.01)
*H04L 12/931* (2013.01)

(52) U.S. Cl.
CPC ............. *H04L 49/201* (2013.01); *H04L 49/101* (2013.01); *H04L 49/351* (2013.01); *H04L 49/103* (2013.01); *H04L 49/90* (2013.01)
USPC ........... 370/381; 370/382; 370/383; 370/412; 370/413

(58) Field of Classification Search
CPC ...... H04L 49/103; H04L 49/90; H04L 49/201
USPC ......... 370/412, 413, 418, 351, 389, 390, 395, 370/401, 411, 395.1, 381, 382, 383; 711/148, 149, 153
See application file for complete search history.

(56) References Cited

U.S. PATENT DOCUMENTS 5,841,722 A  11/1998  Willenz ................. 365/221
5,905,725 A   5/1999  Sindhu et al. .......... 370/389

(Continued)

FOREIGN PATENT DOCUMENTS

EP  0 612 171 A2  8/1994
JP  2000-115178   4/2000

(Continued)

OTHER PUBLICATIONS

U.S. Appl. No. 60/363,144, filed Mar. 6, 2002, Walrand et al.

(Continued)

*Primary Examiner* — Chuong T Ho

(57) ABSTRACT

Generally, a method and apparatus are disclosed that store sequential data units of a data packet received at an input port in contiguous banks of a buffer in a shared memory, thereby obviating any need for storing linkage information between data units. Data packets can extend through multiple buffers (next-buffer linkage information is much more efficient than next-data-unit linkage information). According to another aspect of the invention, buffer memory utilization can be further enhanced by storing multiple packets in a single buffer. For each buffer, a buffer usage count is stored that indicates the sum (over all packets represented in the buffer) of the number of output ports toward which each of the packets is destined.

5 Claims, 19 Drawing Sheets

(56) References Cited

U.S. PATENT DOCUMENTS

| | | | |
|---|---|---|---|
| 5,909,440 A | 6/1999 | Ferguson et al. | 370/389 |
| 5,913,042 A | 6/1999 | Shemla et al. | 370/429 |
| 5,923,660 A | 7/1999 | Shemla et al. | 370/402 |
| 5,930,261 A | 7/1999 | Shemla et al. | 370/428 |
| 5,999,981 A | 12/1999 | Willenz et al. | 709/238 |
| 6,021,132 A * | 2/2000 | Muller et al. | 370/412 |
| 6,088,736 A * | 7/2000 | Manning et al. | 709/234 |
| 6,151,321 A * | 11/2000 | Benson et al. | 370/395.42 |
| 6,240,065 B1 | 5/2001 | Medina et al. | 370/229 |
| 6,247,058 B1 * | 6/2001 | Miller et al. | 709/234 |
| 6,295,299 B1 | 9/2001 | Haddock et al. | 370/423 |
| 6,320,861 B1 | 11/2001 | Adam et al. | |
| 6,434,662 B1 | 8/2002 | Greene et al. | 711/108 |
| 6,470,021 B1 | 10/2002 | Daines et al. | 370/422 |
| 6,493,347 B2 * | 12/2002 | Sindhu et al. | 370/401 |
| 6,501,757 B1 * | 12/2002 | Kamaraj et al. | 370/395.41 |
| 6,532,503 B1 | 3/2003 | Lindenborg et al. | |
| 6,601,089 B1 * | 7/2003 | Sistare et al. | 709/213 |
| 6,809,557 B2 | 10/2004 | Gauthier et al. | 327/101 |
| 6,812,929 B2 * | 11/2004 | Lavelle et al. | 345/535 |
| 7,116,660 B2 * | 10/2006 | Sindhu et al. | 370/389 |
| 7,301,906 B2 * | 11/2007 | Nation et al. | 370/235 |
| 2002/0169921 A1 | 11/2002 | Saitoh | 711/5 |
| 2004/0184448 A1 * | 9/2004 | Beshai | 370/360 |
| 2007/0208876 A1 * | 9/2007 | Davis | 709/240 |

FOREIGN PATENT DOCUMENTS

| | | |
|---|---|---|
| WO | WO 98/27660 | 6/1998 |
| WO | WO 99/00939 | 1/1999 |
| WO | WO 02/09364 A2 | 1/2002 |

OTHER PUBLICATIONS

Naraghi-Pour et al., "A Multiple Shared Memory Switch," System Theory, IEEE Computer Soc., Proceedings of the Twenty-Eighth Southeastern Symposium on Baton Rogue, LA, pp. 50-54 (Mar. 31-Apr. 2, 1996).

Naraghi-Pour et al., "A Multiple Shared Memory Switch," System Theory IEEE Proc. of the 28th Southeastern Symposium on Baton Rouge, IEEE Comput. Soc., pp. 50-54 (Mar. 31, 1996).

* cited by examiner

FIG. 4
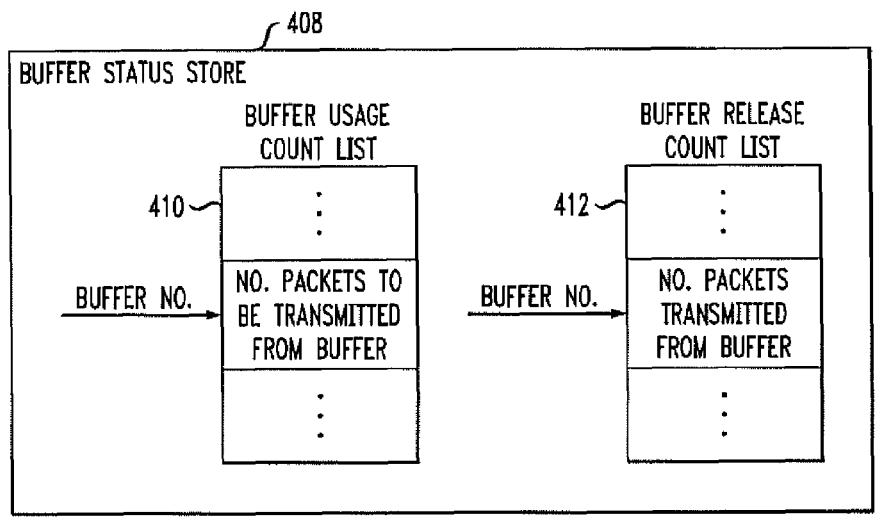
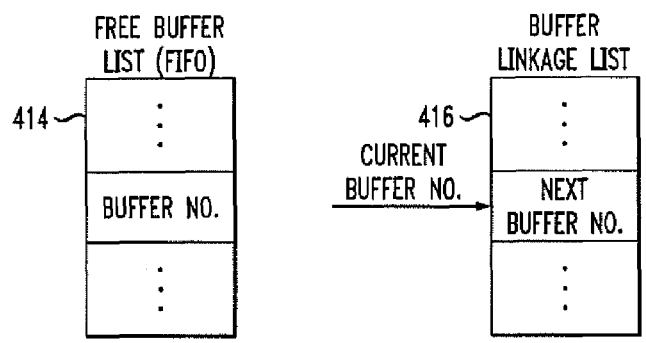
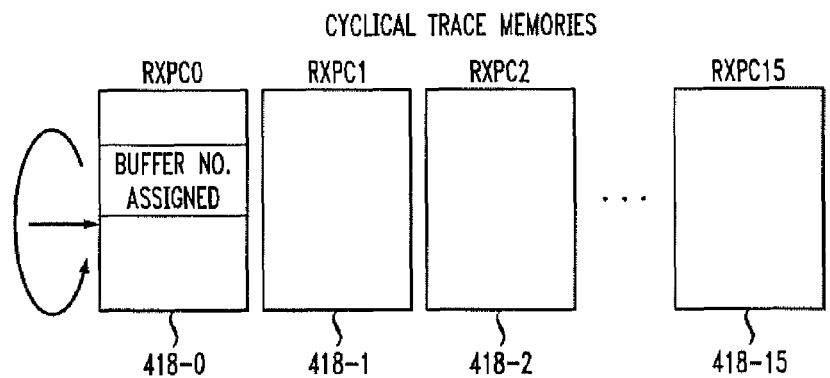

FIG. 15
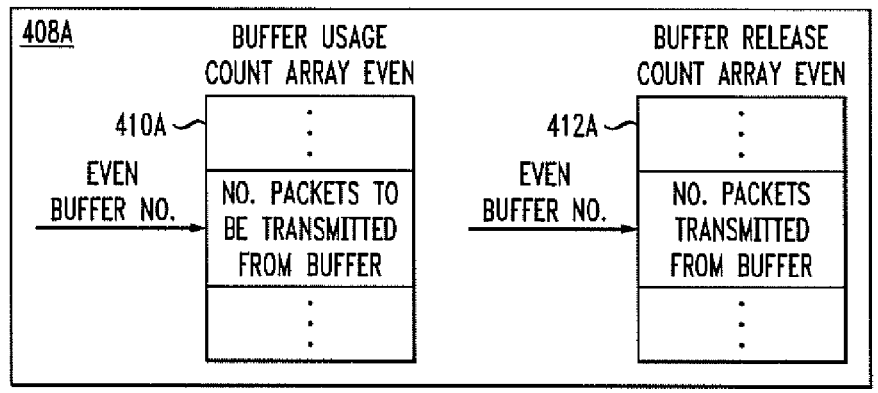
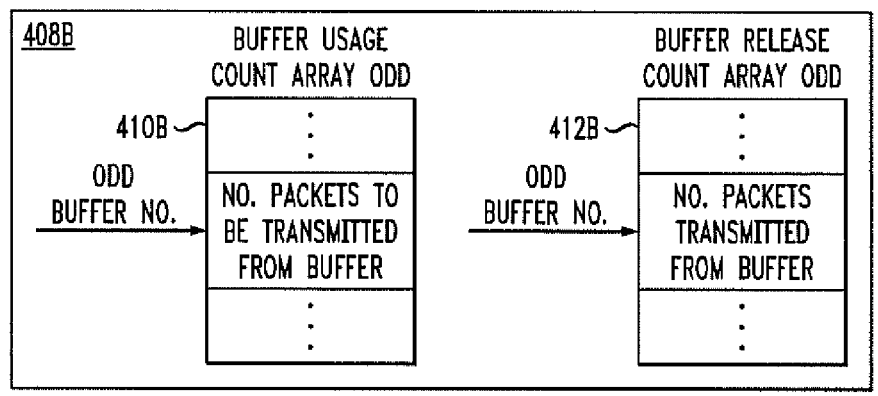
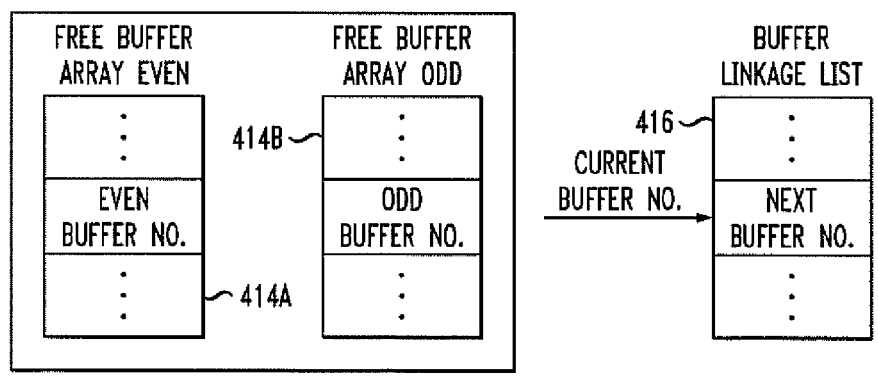
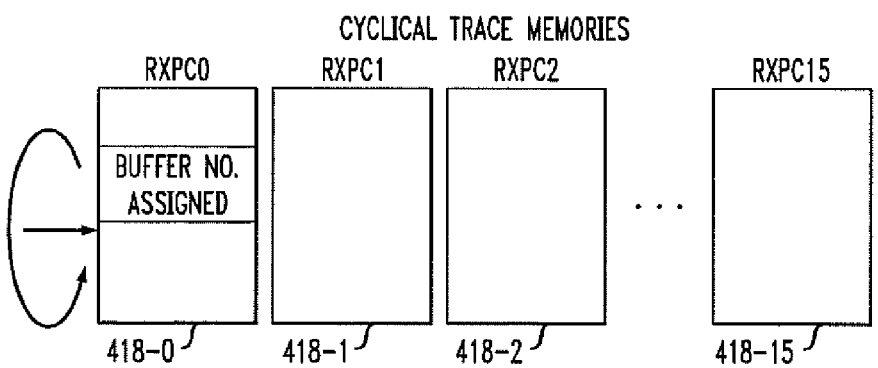

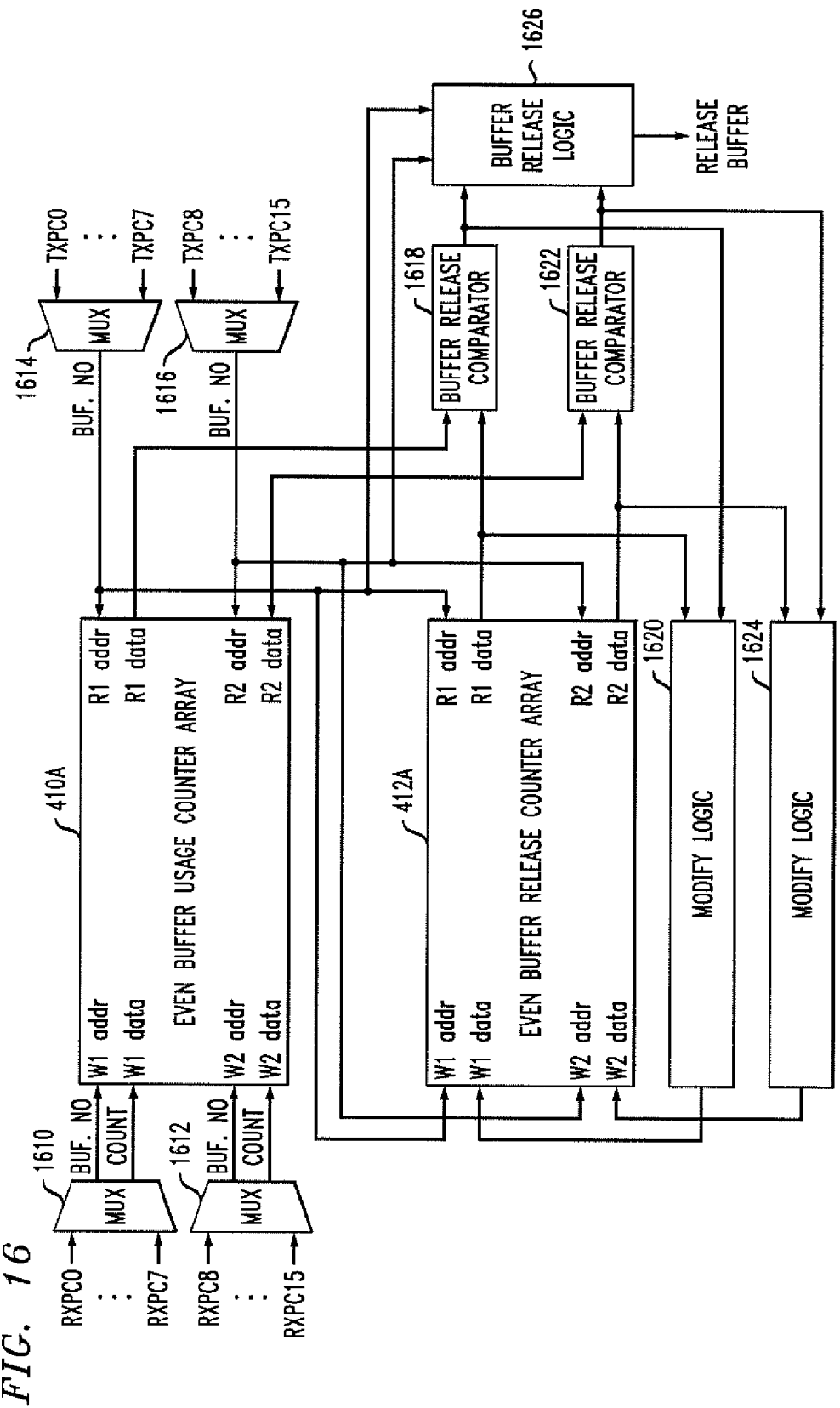

METHOD AND APPARATUS FOR SHARED MULTI-BANK MEMORY IN A PACKET SWITCHING SYSTEM

CROSS REFERENCE TO RELATED APPLICATIONS

This application claims the benefit of U.S. Provisional Application No. 60/464,462, filed Apr. 22, 2003.

FIELD OF THE INVENTION

The present invention relates to packet-based switching fabrics, and more particularly, to methods and apparatus for efficiently switching data packets through a central shared buffer memory.

BACKGROUND OF THE INVENTION

The increasing demands for bandwidth resulting from the ubiquitous deployment of the internet and multimedia applications have generated the need for faster, more efficient networks and network switches, principally, packet switches. There are at least three common switching architectures used in packet switches for forwarding data packets from input ports to output ports: crosspoint (also known as crossbar) matrix, shared bus, and shared memory. A crossbar matrix essentially creates a transient "circuit" between two ports for the duration of a data packet (or subset of a data packet) exchange, based on the destination address and/or other information within a data packet acquired by the packet's entry port. Latency through the switch is minimal since the entire data packet need not be stored within the switch in the process of forwarding the packet. A drawback of the crossbar matrix architecture is the head-of-line blocking that occurs when more than one entry port attempts to send data to the same exit port. A shared-bus architecture uses a common bus as the exchange mechanism for data packets between ports. Depending on the design, each input and output port (or small group of ports) can have its own memory. Like the crossbar matrix, the shared bus architecture is subject to blocking at busy ports.

A shared memory architecture uses a single common memory as the exchange mechanism for data packets between ports. All ports access the shared memory via a shared memory bus. An arbitration mechanism, such as time division multiplexing, controls port access to the memory ensuring each entry port a chance to store received data that can then be accessed by the exit port. A problem with present shared memory architectures, however, is that they are not fast enough to transfer multiple gigabits of data per second from one port to another without blocking port access to memory. Such transfer rates are required for newer, extremely fast packet switches for use in local area networks (LANs), wide area networks (WANs), and telephony and other kinds of switching systems.

Accordingly, there is a need for an improved shared memory architecture for a switching device that can transport data through the switch at the extremely high data rates required to keep up with the newer networks.

SUMMARY OF THE INVENTION

Generally, a method and apparatus are disclosed that store sequential data units of a data packet in contiguous banks of a buffer in a shared memory. Data packets can extend through multiple buffers (next-buffer linkage information is more efficient than next-data-unit linkage information). Buffer memory utilization can be further enhanced by storing multiple packets in a single buffer.

Another aspect of the invention provides techniques for managing the shared memory. A buffer usage count is maintained for at least one of the buffers. The buffer usage count provides an indication of the sum over all packets in a buffer of the number of output ports toward which each of the packets is destined. The buffer usage count provides a mechanism for determining when a buffer is free. The buffer usage count can also indicate a number of destination ports for a packet to perform a multicasting operation.

A more complete understanding of the present invention, as well as further features and advantages of the present invention, will be obtained by reference to the following detailed description and drawings.

BRIEF DESCRIPTION OF THE DRAWINGS

FIGS. 4 and 15 are diagrams illustrating memories and lists in the MMU of FIG. 1;

FIG. 16 illustrates a possible implementation of the even buffer status store of FIG. 15.

DETAILED DESCRIPTION

Figure 1:
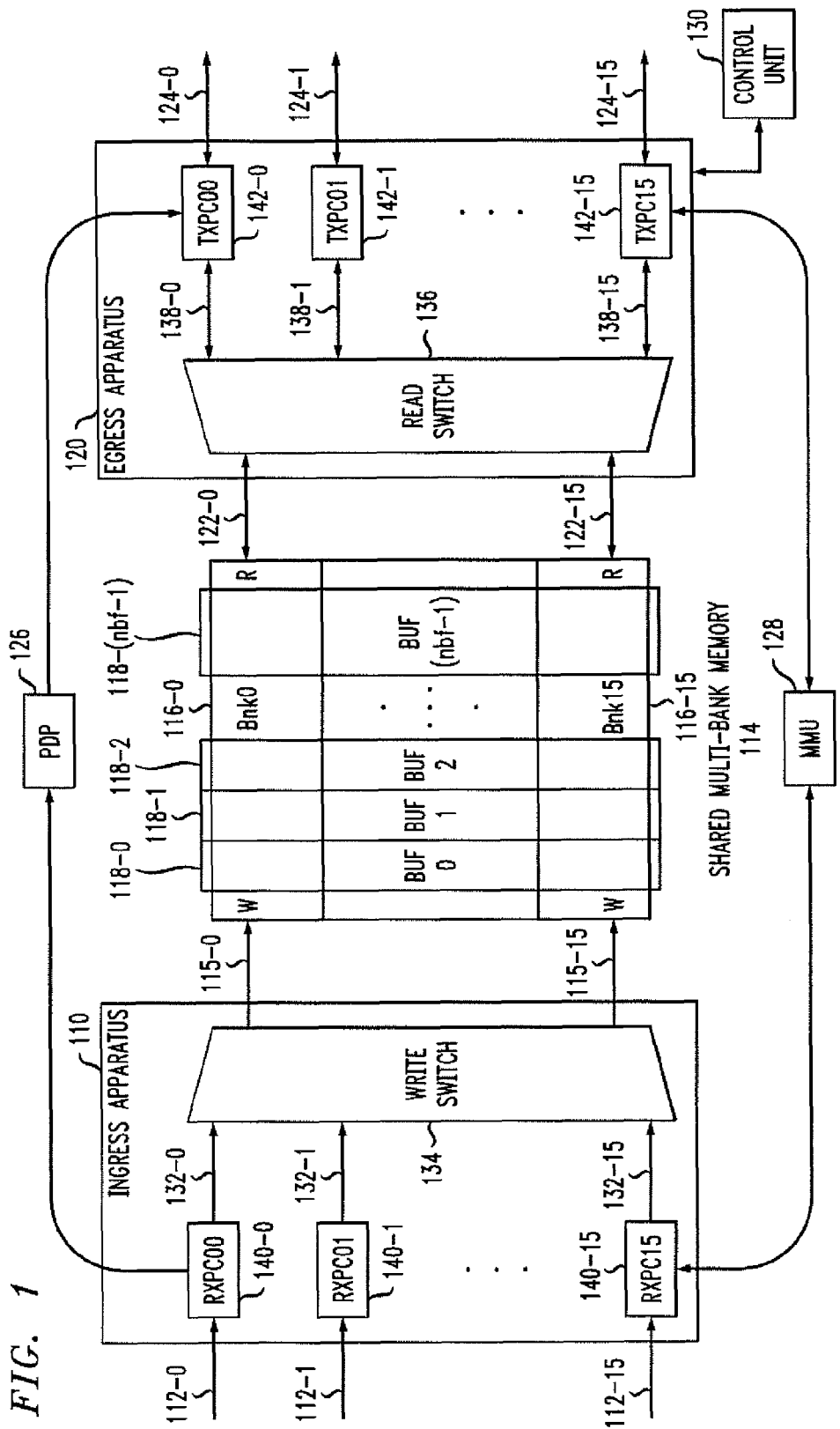
FIG. 1 is a block diagram of a shared memory switching fabric incorporating features of the invention.

FIG. 1 is an overall block diagram of a shared memory switch incorporating features of the invention. In the present detailed description, a "data unit," as that term is used herein, refers to the amount of data transmitted in parallel over a given data path. Typically data unit types include a byte, word, double word, and quadword. The size of a data unit is specific to the data path; a data unit as transmitted over one data path might have a different size than a data unit as transmitted over a different data path, even within the same system. In the embodiment of FIG. 1, a data unit is a quadword for all visible data paths.

A block is a more global concept as used herein and does not depend on the data path size. If a particular data path transmits an entire block of data in parallel, then the block, by definition, contains only one data unit. If the data path transmits only half of each block at a time, then for that data path, a block contains two data units. In the embodiment of FIG. 1, it will be seen that a block contains eight data units. The term "packet," as used herein, refers to a data unit generated according to any protocol. Packets may be fixed or variable in size, depending on the protocol. The embodiments described herein are designed to efficiently handle variable size data packets. They can, however, also handle fixed size data packets. A "data segment," as used herein, implies nothing more than a segment of data. Thus, it is generic to packets, blocks, frames, cells, data units, and portions thereof, and any other grouping of data of any length, fixed or variable.

The shared memory switching fabric includes an ingress apparatus 110 having a number, in this case 16, of fabric input ports 112-0 through 112-15 (collectively 112). In the simplified embodiment of FIG. 1, the ingress apparatus has 16 ingress apparatus data write ports 115-0 through 115-15 (collectively 115). Each ingress apparatus data write port 115-$i$ includes both an address part 115A$i$ and a data part 115D$i$ (not shown separately in the drawing), among other parts, as described more fully below.

In the illustration of FIG. 1, memory 114 is divided vertically into 16 banks 116. The ingress apparatus data write ports 115 are each connected to a respective data write port of a respective memory bank 116 of a shared multi-bank memory 114. In an actual device, however, the different banks of memory may not be positioned as shown in the drawing, and need not be even adjacent to each other physically. The banks 116 are numbered in the drawing 116-0 through 116-15. Stated generally, the data write port of memory bank 116-$i$ is coupled to the ingress apparatus data write port 112-$i$, $i=0 \ldots 15$.

Shared multi-bank memory 114 is further divided horizontally into a plurality of buffers 118. The buffers are numbered 118-0 through 118-($nbf$-1). Each buffer number represents a different address within one of the banks 116. Thus, when data is to be written from one of the ingress apparatus data write ports 112 into one of the memory banks 116 of the shared multi-bank memory, the ingress apparatus specifies to the appropriate data write port of the shared multi-bank memory 114 not only the data to be written, but also an address, or buffer number, at which the data is to be written within the corresponding memory bank 116. In the embodiment described herein, data is supplied to a data write port of the shared memory 114 in quadword (QWD) (8-byte) data units. Within each bank, each buffer is sized to hold one quadword of data. In addition, since there are 16 banks 116 in the memory 114 in this simplified embodiment, each buffer can hold 16 quadwords, or 128 bytes, of data. In an exemplary embodiment, the shared memory 114 contains 1664 buffers, which requires 11 bits to address.

While the memory structure is shown in FIG. 1 as being arranged in rows and columns, with each column being called a "buffer" and each row being called a "bank," it will be appreciated that the physical structure can be different. The columns are referred to herein as "buffers," but that term should not be considered herein to imply any structure or purpose other than a section of memory. Similarly, memory "banks" divide each buffer into memory segments. Typically all buffers contain the same number of memory segments, but this is not an absolute requirement in some aspects of the invention.

Each bank 116 of the shared memory 114 also has associated therewith a corresponding data read port for reading quadwords of data from specified buffers within the bank. Each read data port is coupled to a corresponding port of an egress apparatus 120. In similar manner to the ingress apparatus data write ports 112, the egress apparatus data read ports are numbered 122-0 through 122-15. Each egress apparatus data read port 122-$i$ includes an address part 122A$i$, flowing from the egress apparatus 120 toward the shared memory 114, and a data part 122D$i$, flowing from the shared memory 114 toward the egress apparatus 120. In order to read a data unit from a particular buffer within a particular bank of the shared memory 114, the egress apparatus provides a read address (buffer number) to the appropriate read data port of the shared memory 114. The shared memory 114 retrieves the data from the specified buffer and provides it back to the egress apparatus 120 on the same egress apparatus data read port from which the read address was provided. The egress apparatus 120 also has 16 egress apparatus output ports (which are also fabric output ports) 124-0 through 124-15 (illustratively 124).

The switching fabric of FIG. 1 also includes a packet descriptor processor (PDP) 126 that determines the sequence order and the destination fabric output port(s) 124 for transmitting each data packet that has been received by the ingress apparatus 110 and written into the shared memory 114. The PDP determines the destination fabric output port(s) based upon information in the header of the data packet as it arrived into a fabric input port, and determines the sequence in which packets are to be queued for transmission through a fabric output port based upon the sequence in which they arrived into the fabric, as well as on each packet's class of service. The PDP can cause outgoing data packets to be preempted at 1-block (8 quadword, 64-byte) boundaries in order to grant higher priority switching to higher priority packets. The switching fabric of FIG. 1 also includes a memory management unit (MMU) 128 (described more fully below in conjunction with FIGS. 4, 5, and 15), which among other things, allocates and keeps track of buffer usage in the shared memory 114. The switching fabric of FIG. 1 also includes control circuitry 130, which may include a processor and various other control functions, needed to supervise the operation of the fabric of FIG. 1. Though control unit 130 is illustrated in FIG. 1 as a separate, unitary module, it will be appreciated that in a practical implementation the various parts or functions of the control unit 130 may in actuality be distributed among the various modules of the fabric.

Ingress apparatus 110 includes a receive port controller (RXPC) 140 (described more fully below in conjunction with FIGS. 2 and 10) for each of the fabric input ports 112. Each receive port controller 140-$i$ receives data units in a stream from its corresponding fabric input port 112-$i$. After some optional reordering, as described in more detail below, RXPC 140-$i$ provides the data units in respective streams 132-$i$ to corresponding input ports of a write switch 134. Each stream 132-$i$ includes both an address part 132A$i$ and a data part 132D$i$ (not shown separately), among other information. The data part 132D$i$ carries one quadword of data, and the address part 132A$i$ carries a buffer address into which the data is to be written. The write switch has 16 output ports which form the data write ports 115 of the ingress apparatus 110. Write switch 134 is essentially a cyclical data path rotator which provides on each of its outputs 112-$i$ the information from a rotating sequence of the receive port controllers. Thus, for each $k^{th}$ time slot of a cycle, write switch 134 provides on each of its output ports 112-$i$ an address and data combination from RXPC 140-($i+k$). Stated another way, the data units output by the receive port controllers 140 in their respective output data streams 132 will appear in a rotating sequence of the ingress apparatus data write ports, such that each $k^{th}$ data unit output by each RXPC 140-$i$ on its output data path 132-$i$ will appear on ingress apparatus data write port 112-{(i+k)mod 16}. It is the responsibility of the receive port controllers to ensure that each data unit is provided to the write switch 134 at the proper time in order to be written into the proper bank 116 of shared memory 114 in accordance with the cyclical rotation of the write switch 134.

As used herein, the term "time slot" refers to a defined time period as experienced at a particular input of reference. Information that is to be provided from one unit to another "for a particular time slot," is provided from the source unit at a time that is appropriate such that it will reach the destination unit within the particular time slot. Due to pipelining and other delays, the information might be asserted by the source unit during an earlier time slot, so that it will be received at the destination unit within the desired particular time slot. In one embodiment, a time slot can be defined by a clock signal as received at the destination reference unit, with each time slot having a duration equal to one full clock cycle (less setup and hold times). Where more than one output is said to provide information "for a particular time slot," then, although the information might be asserted by different outputs during different time slots, they will all appear at the reference unit during the common "particular" time slot. In another embodiment, a time slot can be defined by a sequential plurality of clock periods. In this case, if more than one output is said to provide information "for a particular time slot," then the system might be designed such that each output asserts its information in time for it to be received at the destination reference unit in time for a particular clock edge within the particular time slot. Information may thus be provided and clocked into the destination unit in a staggered, or time domain multiplexed (TDM) manner, in which each source output asserts its information such that it reaches the destination unit in time for a respective pre-assigned event within the particular time slot.

Egress apparatus 120 also includes a transmit port controller (TXPC) 142 (described more fully below in conjunction with FIGS. 3, 13, and 14) for each of the fabric output ports 124. Each transmit port controller 142 transmits data units in a stream from data packets in the shared memory 114 that are destined for the corresponding fabric output port 124. The PDP 126 notifies each TXPC 142 of the starting address (buffer and bank number) in the shared memory 114 from which to start retrieving data units, and the TXPC 142 requests the appropriate data units sequentially through a read a switch 136. The read switch 136 is similar to the write switch 134 in that its 16 data read ports 122 are connected to corresponding data read ports of the shared memory 114. Like the write switch 134, the read switch 136 carries data retrieval requests (addresses, in part) from the individual TXPCs 142 to the various data read ports of the various banks 116 of the memory 114, in a cyclically rotating sequence. At a fixed time later, data retrieved from the shared memory 114 is returned to the requesting TXPC 142 via the data parts 122D (not shown separately) of the data read ports. The return data paths in the read switch 136 rotate in the same manner as the paths carrying their retrieval requests, but are delayed by an appropriate fixed number of clock cycles to ensure that each data unit is returned to the same TXPC 142 that requested it Each TXPC 142-$i$ provides the addresses of its data retrieval requests on the address part 138A-$i$ (not shown separately) of a respective communication path 138-$i$, and receives its return data via the data part 138D-$i$ (not shown separately) of the respective communication path 138-$i$.

For each $k^{th}$ time slot of a cycle at the shared memory data read ports, read switch 136 provides toward the address part 122A$i$ of the data read ports of the shared memory 114, a retrieval address from TXPC 142-{(i+k)mod 16}. Stated another way, the data retrieval addresses generated by the transmit port controllers on their respective retrieval address lines 138A will appear in a rotating sequence of the egress apparatus ports toward the data read ports of the shared memory 114, such that each $k^{th}$ data retrieval address generated by each TXPC 142-$i$ toward the read switch 136 on its path 138A$i$ will appear on the egress apparatus read data port 122-{(i+k)mod16}, respectively. It is the responsibility of the transmit port controllers 142 to ensure that each data retrieval address is provided to the read switch 136 at the proper time in order to be provided to the data read port of the proper bank 116 of shared memory 114 in accordance with the cyclical rotation of the read switch 136.

Similarly, for each $k^{th}$ time slot of a cycle at the $i^{th}$ shared memory data read port, read switch 136 carries from the data part 122D$i$ (not shown separately) of the data read port 122-$i$, the data unit requested by TXPC 142-$i$ for the $k^{th}$ time slot. The read switch 136 transfers such data units onto data path 138D{(i+k)mod 16}. Stated another way, the data returned to the transmit port controllers 142 on their respective return data lines 138D will have been read from a rotating sequence of the banks 116, such that each $k^{th}$ data unit transferred toward each TXPC 142-$i$ by the read switch 136 on path 138D$i$ will have been retrieved from bank 116{(i+k)mod 16}.

Overall Operation

In overall operation of the fabric of FIG. 1, data packets are received into the ingress apparatus 110 by individual RXPCs 140, which write them into the shared multi-bank memory 114. The RXPCs 140 notify the PDP 126 of the availability of a packet to transmit, and the PDP 126 notifies the appropriate one or more TXPCs 142 to start transmitting the packet. When an RXPC 140 writes a packet of data into the memory 114, it writes sequential data units of the packet into contiguous banks of a buffer. If a data packet ends before the end of a buffer, then the RXPC 140 begins writing its next data packet into the next contiguous bank of the same buffer. If an RXPC 140 reaches the end of a buffer before it reaches the end of the data packet, then the MMU 128 allocates a new buffer to the RXPC 140, which then continues to write further data units of the packet beginning with bank 0 of the new buffer. Because sequential data units of a given incoming data packet are written into contiguous banks of each buffer in the shared memory 114, there is no need for sequential data units of the packet to include linking information, in the shared memory 114, indicating where to find each next sequential data unit. In certain prior art designs, such linking information can occupy as much as 20 percent of the space in the shared memory. In addition, by being able to pack the units of more than one data packet into the single buffer, the fabric of FIG. 1 avoids wasting all the buffer space beyond the end of a packet, that might be wasted in a system that requires each data packet to begin with bank zero of a new buffer.

As used herein, two data units are "sequential" if they are temporally sequential as they arrive on a transmission line—that is, one follows the other with no other data units in between. Data units described herein as being "sequential within a data packet," can nevertheless be separated from each other by other data units, for example data units of a different interleaved data packet. As long as two data units are sequential when considering only those data units in a particular data packet, the two data units are considered herein to be "sequential within a data packet." Data packets, too, can be considered "sequential," even if they are interleaved with each other, the sequence in this case is the sequence in which the data packets start. Within an RXPC 140, data that arrived "sequentially" might be parallelized or re-organized in another manner. Typically, however, the sequential nature of the data is maintained at least logically.

"Contiguous" storage in memory means having consecutive addresses in the memory. Two addresses are consecutive if the device employs a deterministic sequence in which addresses are incremented, and the incrementing of one of the addresses once according to the deterministic sequence yields the other address. Usually, but not necessarily, the deterministic sequence is such that each next address is one higher than the previous address. Contiguous memory locations need not be physically adjacent, even where consecutive addresses are strictly numerically sequential according to the deterministic sequence.

Packets stored into the shared memory 114 usually are not, of course, retrieved for transmission in the same order that they were written into the memory. Thus, if a particular buffer 118 contains the units from more than one data packet, the full retrieval of one data packet does not necessarily signify that the buffer can be released back to the ingress apparatus and for reuse. In order to keep track of buffer usage and release information, the fabric of FIG. 1, specifically the MMU 128, maintains a store indicating, for each buffer 118 in use, the number of buffer "touches" that are required before the buffer should be considered "empty." As used herein, a portion of memory (e.g. a bank or a buffer) is "empty" if no further use will be made of any data it contains. It is not necessary that the portion of memory have been erased.

A buffer "touch," in the embodiment of FIG. 1, includes the reading of the last data unit of a packet from the buffer, and also includes the reading of the last the data unit of the buffer. (If the last data unit of a packet coincides with the last data unit of the buffer, then only one touch is registered.) In one embodiment, the number of buffer touches that are required before the buffer should be considered empty is the same as the number of data packets "represented" in the buffer. A data packet is "represented" in a buffer if the buffer contains at least one data unit of the packet. Thus, if a first data unit ends in the middle of a given buffer, and the next data unit begins in the next contiguous bank and overflows into another buffer, then the packet usage count for the given buffer would be two: one for retrieving the last data unit of the first data packet, and one for retrieving the last data unit of the buffer.

The maintenance of a buffer usage count also enables the implementation of a multicast capability. In particular, if a particular data packet represented within a particular buffer is destined for more than one, for example three, fabric output ports 124, then the buffer usage count for the particular buffer would account for three touches. Stated more generally, the buffer usage count indicates the sum, over all packets represented in the buffer, of the number of output ports toward which each of the represented packets in the buffer is destined. If a packet is a unicast packet, then the buffer usage count includes only one touch for that packet because it is destined for only one fabric output port. If a packet is a multicast packet, destined for N of the fabric output ports, then the buffer usage count includes N touches for that packet. In the fabric FIG. 1, it is the job of the PDP 126 to instruct the TXPC 142 of each destination output port 124 to retrieve the data from the buffer in which stored for a particular packet. For a multicast packet destined for three fabric output ports 124, the PDP 126 will instruct each of the corresponding three TXPCs 142 to retrieve the same data. Each such TXPC notifies the MMU 128 of one buffer touch in conjunction with its own retrieval of the packet data. The MMU 128 keeps track of the number of touches received, and releases the buffer only when all of the TXPCs 142 through which each data packet represented the buffer is destined, has indicated a touch.

Figure 2:
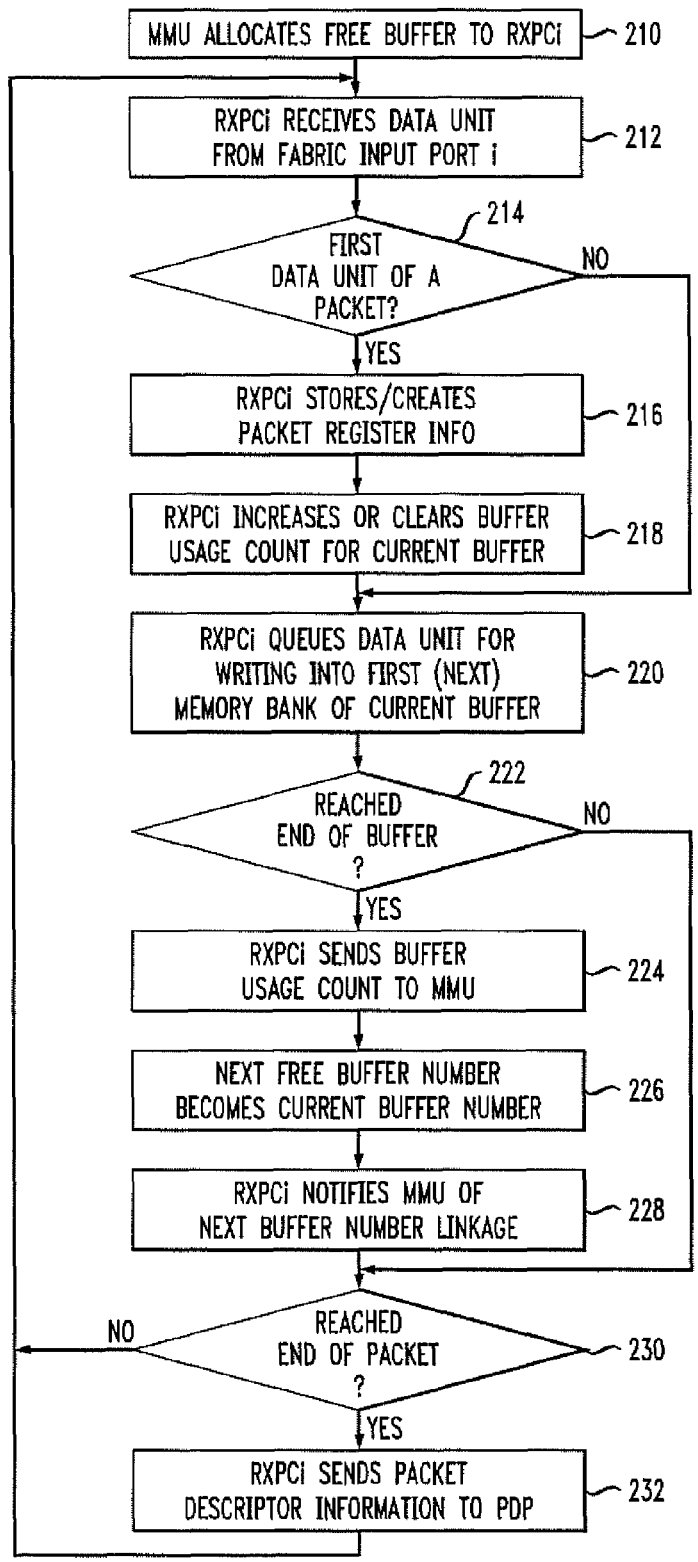
FIG. 2 is a flowchart illustrating functions performed by a receive port controller of FIG. 1.

Except for TDM interfaces to shared memory 114, the RXPCs 140 operate independently of each other and independently of the TXPCs 142. FIG. 2 is a simplified flowchart illustrating the major functions performed by an RXPC 140. When flow charts are shown herein, it will be appreciated that many of the illustrated steps can be performed in parallel or in a different sequence without affecting the functions achieved. In the flow chart of FIG. 2, the MMU 128 allocates a free buffer to the RXPC 140 (step 210). The RXPC 140 maintains a free buffer number prefetch FIFO, which pre-requests next free buffer numbers from the MMU 128 whenever the FIFO is not full. During step 212, the RXPC 140 receives a data unit of a data packet from the corresponding fabric input port 112. During step 214, a test is performed to determine if the received data unit is the first data unit of a packet. If it is determined that it is the first data unit of a packet (step 214), then the RXPC 140 stores packet descriptor information (step 216) that will be transmitted to the PDP 126. The packet descriptor information includes the starting address (buffer number and bank number) of the packet in shared memory 114, class of service, and other information not pertinent to the present description. It also includes information from the incoming packet header that the PDP 126 can use to determine the destination TXPC 142 (for unicast) or TXPCs 142 (for multicast).

In step 218, the RXPC 140 updates the packet usage count for the current buffer to account for the current data packet, i.e., for a unicast packet, the RXPC 140 increases the count indicated by the packet usage count by one, or clears it if this is the first write to the current buffer. For a multicast packet, as previously mentioned, the RXPC 140 increases the packet usage count by the total number of TXPCs 142 to which this packet is destined (that information is available from the incoming frame header), or sets it to that number if this is the first write to the current buffer. As used herein, a value that "indicates" an item of information does not necessarily require that such item of information be specified directly. Information can be "indicated" by simply referring to the actual information through one or more layers of indirection, or by identifying one or more items of different information which are together sufficient to determine the actual item of information. In addition, the term "identify" is used herein to mean the same as "indicate." In the embodiment of FIG. 1, the actual value stored to "indicate" the buffer usage count is one less than the actual count. Other embodiments can indicate the count in other ways.

In step 220, whether or not the current data unit is the first data unit of a packet, the RXPC 140 queues the current data unit for writing into the first (next) memory bank of the current buffer 118 in shared memory 114. During step 214, a test is performed to determine if the current buffer is full, i.e., if the end of the buffer was reached, or if a timeout has elapsed since the last write to the current buffer. If it is determined that the current buffer is full or a timeout has elapsed since the last write to the current buffer, then the RXPC 140 notifies the MMU 128 of the final buffer usage count for the current buffer (step 224). The next free buffer number from free buffer number prefetch FIFO becomes the current buffer number, and the free buffer number prefetch FIFO pre-requests the next free buffer number from the MMU 128 (step 226). In step 228, the RXPC 140 notifies MMU 128 of the linkage from the last buffer number to the current buffer number (to be used in conjunction with the operation of the TXPCs 142). Note that if the current data unit is also the last data unit of a packet, this linkage information will never be used. In another embodiment, therefore, the RXPC can omit notifying MMU of buffer linkage if the last data unit of a buffer is also the last data unit of a packet.

In step 230, if the current data unit is the last data unit of a packet, as indicated by the frame format (such as an end-of-packet (EOP) indication in a trailer of the incoming frame), then the RXPC 140 also transmits its stored packet descriptor information, plus packet length information, to the PDP 126.

Figure 3:
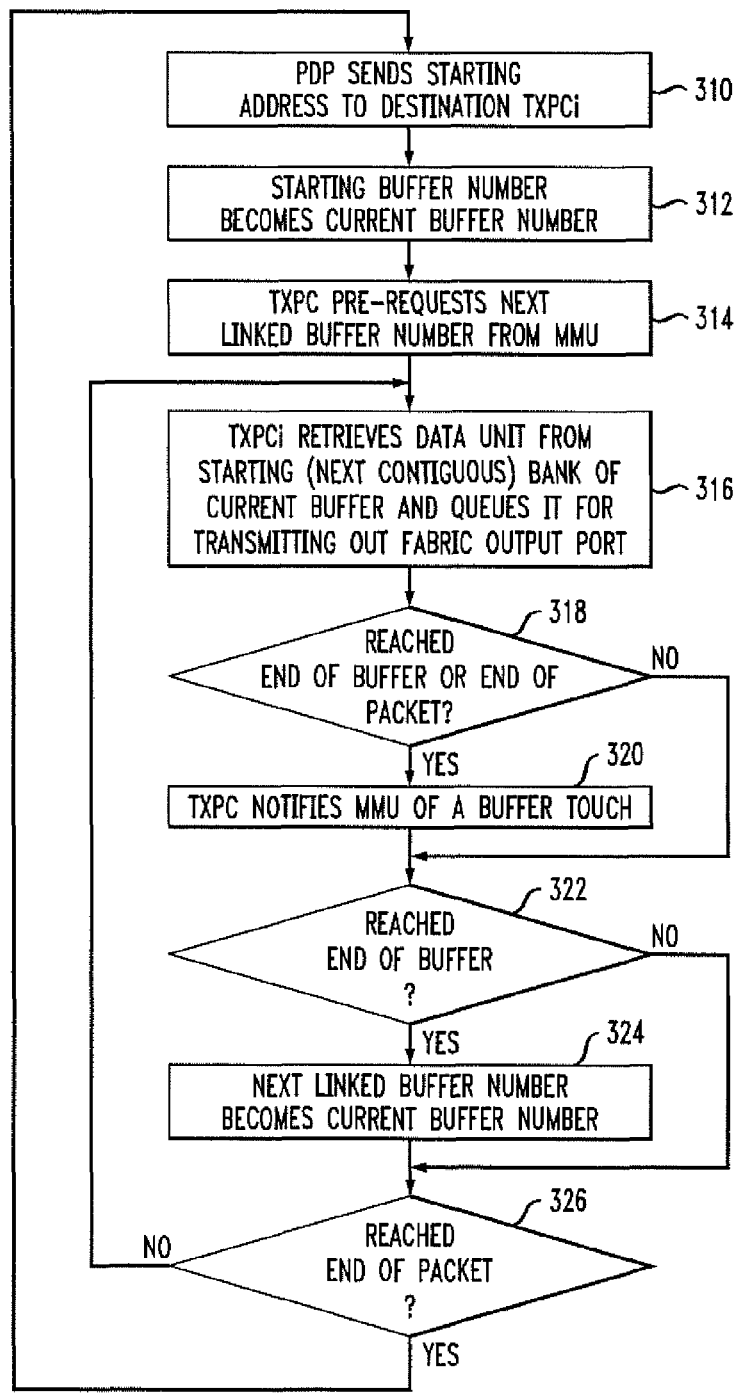
FIG. 3 is a flowchart illustrating functions performed by a transmit port controller of FIG. 1.

FIG. 3 is a simplified flowchart illustrating the major functions performed by a TXPC 142 (FIG. 1). In step 310, the TXPC 142 receives from the PDP 126 an instruction to transmit a particular packet of data from the shared memory 114. Such instructions are accumulated in a packet transmit instruction FIFO (not shown) in the TXPC 142, and include the starting address (buffer and bank numbers) of the packet in the shared memory, the packet length, the class of services, and other information not important for the present description. In step 312, the specified starting buffer number becomes the current buffer number. In step 314, the TXPC 142 pre-requests the next linked buffer number from the MMU by providing the current buffer number. The TXPC 142 maintains a pre-fetch FIFO (not shown) of next linked buffer numbers from the MMU 128, and re-fills the FIFO from the tail whenever a buffer number is taken from the head of the FIFO.

In step 316, the TXPC 142 retrieves a data unit from the specified starting (or next contiguous) memory bank of the current buffer and queues it for transmitting out the fabric output port 124 associated with the TXPC 142. During step 318, a test is performed to determine if the retrieved data unit is the last data unit in a packet (as indicated by the packet length value in the instruction from the PDP 126), or if the retrieved data unit is last data unit in the current buffer. If it is determined that the retrieved data unit is the last data unit in a packet, or if the retrieved data unit is last data unit in the current buffer (step 318), then the TXPC 142 notifies the MMU 128 of a touch of the current buffer (step 320). A test is then performed to determine if the retrieved data unit is the last data unit in the current buffer (step 322). If it is determined that the retrieved data unit is the last data unit in the current buffer, then the pre-requested next linked buffer number becomes the current buffer number (step 324). During step 326, a test is performed to determine if the retrieved data unit is the last data unit in the packet. If it is determined that the retrieved data unit is the last data unit in the packet (step 326), then the TXPC 142 returns to step 310 to process the next packet transmit instruction from PDP 126; otherwise, the TXPC 142 returns to step 316 to retrieve the next data unit from the next contiguous bank of the current buffer.

In order to best understand the various operations or functions performed by MMU 128, it will be useful first to identify the various lists and memories that it uses to manage buffer usage in the shared memory 114. FIG. 4 illustrates a simplified set of these lists. As shown, the MMU maintains a buffer status store 408 which contains the indications of buffer usage counts as described previously with respect to FIG. 1. This store is indexed by buffer number, and as mentioned, the actual values contained in the list are one less than the number of touches that the MMU 128 must receive notification of (from TXPCs 142) before the corresponding buffer 118 is considered empty. The counts are "written" in response to buffer usage counts provided by RXPCs 140, and are "updated" in response to touch notifications from TXPCs 142. As used herein, the "writing" of a value may or may not be preceded by reading of a prior value, whereas the "updating" of a value refers to writing of a value in dependence upon the prior value (whether read from the memory (read-modify-write) or read from somewhere else).

In one embodiment, the buffer status store 408 can include a single list containing current counts, which are written into by the RXPCs 140 and decremented by the TXPCs 142 in accordance with touches. In such an embodiment, a buffer might be considered empty and available for re-use when the current count for that buffer falls to 0. In the embodiment of FIG. 4, however, the buffer status store 408 includes two separate lists: a buffer usage counter list 410 and a buffer release counter list 412, both indexed by buffer number. Instead of decrementing the buffer usage counts for each buffer whenever the MMU 128 receives a touch notification for that buffer, the MMU 128 instead increments the corresponding entry in the buffer release counter list 412. An empty buffer is indicated when the two counts are equal. In both embodiments, it can be said the number "indicated by" the count for a particular buffer is "decremented" in response to a touch notification for that buffer because of the usage of the term "indicated" herein.

MMU 128 also includes a free buffer list 414 that contains free buffer numbers for allocation to the RXPCs 140. Free buffer list 414 is a FIFO structure. Buffer numbers are provided to the RXPCs 140 from the head of the FIFO, and buffers that have been emptied by the TXPCs 142 and released (in accordance with the buffer usage and release counts lists 410 and 412) are added to the tail of the list 414. In other embodiments, the free buffer list 414 can be structured in other ways, such as by a vector of bits, each corresponding to a respective buffer, and each indicating whether or not the buffer is free. MMU 128 also includes a buffer linkage list 416. The buffer linkage list 416 is indexed by a current buffer number and indicates in that entry the next linked buffer number as was previously provided by an RXPC 140.

The MMU 128 also includes a series of cyclical "trace" memories or lists 418-0 through 418-15; one list corresponding to each of the RXPCs 140. Each memory 418 has a length of C entries and contains a list of the C buffer numbers that were allocated most recently to the corresponding RXPC 140. The memories 418 are written only in a rotating cycle, such that new entries will overwrite previous entries that are older than the most recent C. In one embodiment, C=6. The purpose of the cyclical trace memories 418 will described hereinafter.

Figure 5A:
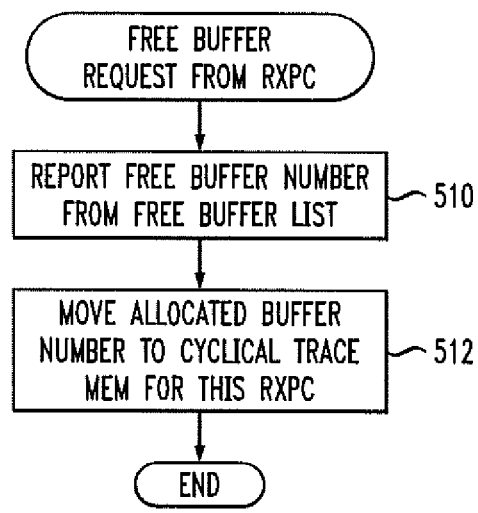
FIGS. 5A, 5B, 5C, 5D and 5E (collectively, FIG. 5) are flowcharts illustrating some functions performed by the MMU of FIG. 1.

FIGS. 5A, 5B, 5C, 5D and 5E (collectively, FIG. 5) are flowcharts illustrating five specific functions performed by MMU 128. FIG. 5A illustrates the functions performed upon receipt of a buffer request from an RXPC 140. In step 510, the MMU 128 sends the buffer number at the head of the free buffer list 414 to the RXPC 140. In step 512, the MMU 128 moves the allocated buffer number from the list 414 of free buffers to the end of the cyclical trace memory 418 for the RXPC 140 that requested it.

Figure 5B:
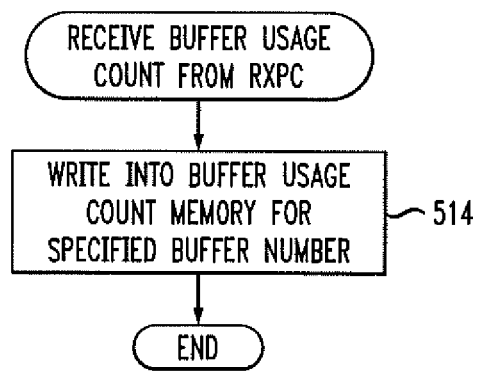

In FIG. 5B, the MMU 128 writes the buffer usage count from the RXPC 140 into the buffer usage counter list 410 indexed by the specified buffer number when the MMU 128 receives a buffer usage count report from an RXPC 140 (step 514).

Figure 5C:
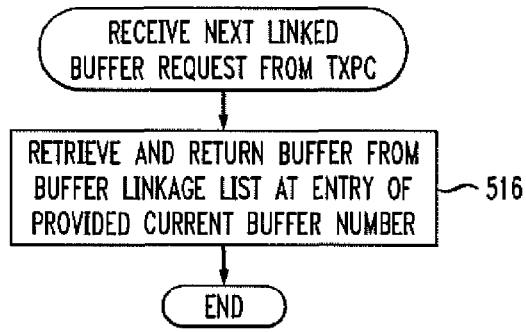

In FIG. 5C, the MMU 128 retrieves the buffer number stored in the buffer linkage list 416 at the entry of the provided current buffer number when the MMU 128 receives a request from a TXPC 142 for the next linked buffer (step 516).

Figure 5D:
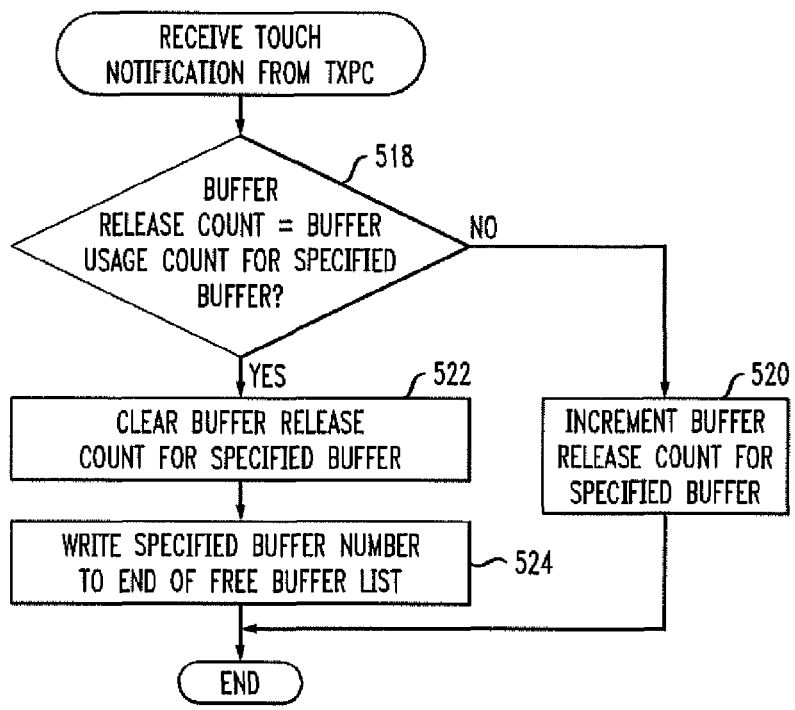

In FIG. 5D, if the MMU 128 receives a buffer touch notification from a TXPC 142, the MMU 128 retrieves the buffer release count from the buffer release counter list 412 at the entry corresponding to the specified current buffer number, and the buffer usage count from the buffer usage counter list 410 at the entry corresponding to the specified buffer number.

A test is then performed to determine if the two counts are equal. If it is determined during step 518 that the two counts are not equal (the buffer is not yet empty), MMU 128 increments the buffer release count for the specified buffer (step 520), and the procedure ends. If the two counts are equal (the buffer is empty), MMU 128 clears the buffer release count for the specified buffer in buffer release counter list 412 (step 522) and, in step 524, MMU 128 adds the specified buffer number to the end of free buffer list 414. There is no need to erase the now-released buffer number from the buffer linkage list 416, because the entry that currently contains it, which is the entry indexed by the previous buffer number, will not be read again until after the associated buffer has already been overwritten by a new linked buffer number.

Buffer Scrubbing

The shared memory 114 (indeed, any shared memory) has a limited number of buffers 118 available for storing data units from the ingress apparatus 110. Buffers are used by the ingress apparatus 110, and then released by the egress apparatus 120 after they have been emptied. The MMU 128 in the embodiment of FIG. 1 is responsible for keeping track of the buffers 118, allocating them to the ingress apparatus 110 when needed, and releasing them back to the free list 414 when empty. It may happen that buffers become lost. For example, if the MMU 128 offers a free buffer number to one of the RXPCs 140, an alpha particle may negate one bit of the buffer number as it is clocked into the RXPC 140. In this case, the RXPC 140 might receive a buffer number different from the one allocated by the MMU 128. The RXPC 140 would then write its next data units into the wrong buffer, and proceed thereafter as usual. The buffer number that was allocated by the MMU 128 then is not being written to by any RXPC 140, is not available for allocating to another RXPC 140 since it is no longer in the MMU's free buffer list 414, will never be mentioned with packet buffer information transmitted from the RXPC 140 to the PDP 126, and will never be released by the egress apparatus 120 because the PDP 126 will never instruct any TXPC 142 to read from that buffer number. The buffer number allocated by the MMU 128, therefore, is now lost Over a period of hours, days or weeks, it is possible that a substantial number of the buffers 118 in the shared memory 114 can become lost in a similar manner.

Figure 5E:
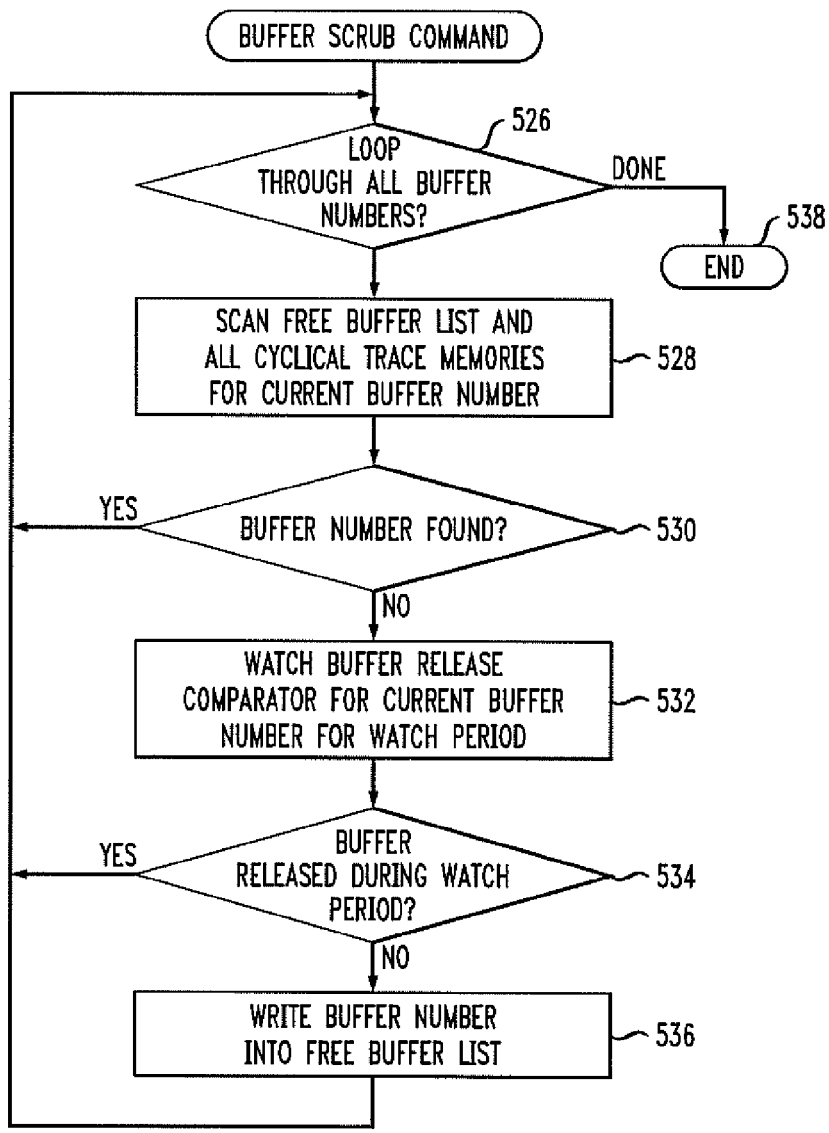

In order to overcome this problem and recover any lost buffers, the control unit 130 occasionally (for example, on the order of hours) instructs the MMU 128 to perform a buffer scrub operation. FIG. 5E is a flowchart setting forth the operation performed by buffer scrub logic in the MMU 128 in response to such an instruction. In step 526, the MMU 128 begins a loop through all of the buffer numbers. If shared memory 114 contains 1664 buffers, for example, then the MMU 128 loops through the numbers 0-1663. In another embodiment, some or all buffer numbers can be checked in parallel, but in the embodiment of FIG. 1, a serial loop is sufficiently fast since buffer loss occurs infrequently enough that there is no urgency to recovering lost buffers.

If a buffer number is not lost, then at any given time it is either in the list of free buffers 414, or it has been allocated to one of the RXPCs 140 and should therefore be represented in the cyclical trace memory 418 for that RXPC 140. Step 528 handles these two possibilities. A third possibility is that the buffer number was assigned to an RXPC 140 and written into the corresponding cyclical trace memory 418, but was later overwritten in the cyclical trace memory 418 with subsequent buffer numbers allocated to the same RXPC 140. In this case, if the buffer is not lost, then the RXPC 140 to which it was allocated will eventually fill it and the PDP 126 will eventually cause the egress apparatus 120 to empty it. This third possibility is handled in steps 532 and 534.

Accordingly, in step 528, the buffer scrub logic in MMU 128 scans the free buffer list 414 and all of the cyclical trace memories 418 for the current buffer number. For each buffer number, a test is performed to determine if the buffer number is stored in one of these memories (step 530). If it is determined that the buffer number is stored in one of these locations (step 530), then the routine returns to step 526 to look for the next buffer number, otherwise, the buffer scrub logic watches the buffer release comparator for the current buffer number for a predetermined (software programmable) watch period (step 532). The watch period preferably is set to be at least as long as the maximum expected latency of a packet traversing the fabric, plus some maximum expected time for an RXPC 140 to fill the buffer. Thus, if a buffer is absent from the free buffer list 414 and all the trace memories 418 only because it had already been overwritten in one of the cyclical trace memories 418, then the buffer will certainly be released during the watch period. If by the end of the watch period the buffer has been released (step 534), then the current buffer number is not lost and the buffer scrub logic returns to step 526 to look for the next buffer number. If the current buffer number still has not been released by the end of the watch period (step 534), then the buffer number can be considered lost and must be recovered. In another embodiment, the logic could watch a different part of the buffer release logic, such as the buffer touch indications themselves from the TXPCs. The scrub logic recovers the lost buffer in step 536 by writing the lost buffer number into the free buffer list 414. The buffer scrub logic then returns to step 526 to look for the next buffer number. When all buffer numbers have been checked, the buffer scrub procedure ends (step 538).

Shared Multi-Bank Memory

The shared memory 114 (FIG. 1) can be constructed with 16 register files, one for each bank. The memory banks 116 can be single port memory, in which case egress accesses to the memory might be designed to alternate with ingress accesses to the memory. In the embodiment of FIG. 1, however, each bank 116 is constructed with dual port memory, one read port and one write port. Dual port memory enables read and write access to occur simultaneously, effectively doubling the data rate permitted by the memory.

Figure 6:
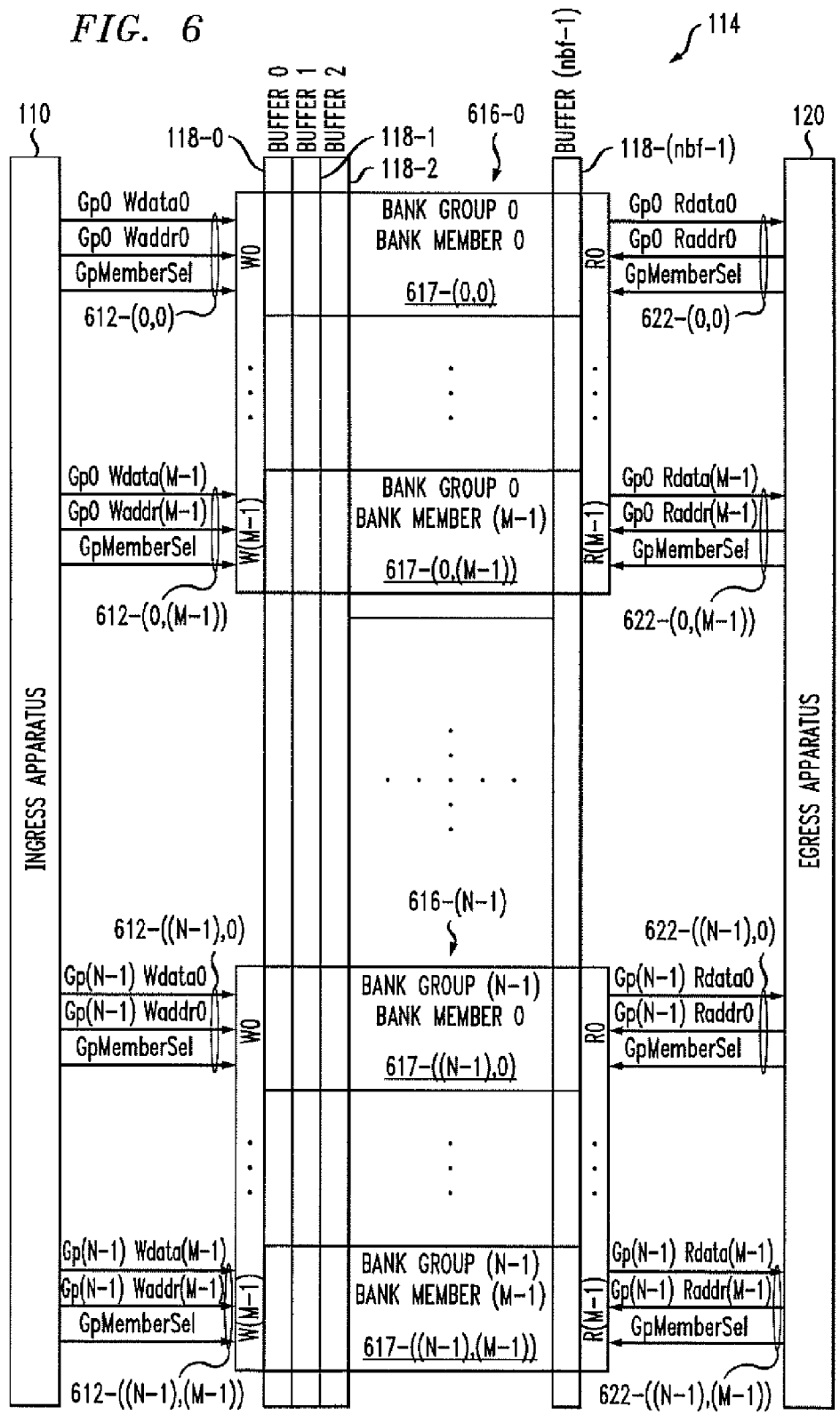
FIG. 6 is a block diagram of an alternate shared memory switching fabric incorporating features of the invention.

The data rate can be further increased by adding additional banks of memory in groups, such that each group of banks 116 contains M bank members. FIG. 6 is a block diagram illustrating the organization of a shared memory 114 having N groups of memory banks, with M members in each group of memory banks. In the fabric of FIG. 1, N=16 and M=1. Referring to FIG. 6, N groups 616 of banks, 616-0 through 616-(N−1), are shown. Group 616-0 contains M bank members 617-(0,0) through 617-(0, (M−1)). Similarly, group 616-(N−1) contains M bank members 617-((N−1), 0) through 617-((N−1), (M−1)). In general, group 616-g contains M bank members 617-(g, 0) through 617-(g,(M−1)). The memory 114 remains divided in the horizontal dimension into buffers 118, as shown in FIG. 1.

The numberings shown in the figures and described herein are convenient for accuracy of the descriptions, but it will be appreciated that the correspondence between item numbers in the figures and physical items on a device is completely arbitrary. The only requirement in the correspondence is that items bearing different numbers in the figures correspond to different respective items in a physical device. In addition, whenever a set of items are numbered herein with hyphenated designations, it will be understood that the same designation without the hyphenated suffix refers to an illustrative one of the items. For example, whereas a $g^{th}$ member of a group might be numbered 616-*g*, it will be understood that any illustrative member of the group might be referred to herein as simply 616.

Each memory bank group 616-*g* contains M data write ports 612-(*g*, 0) through 612-(*g*, (M−1)) (illustratively 612) and M data read ports 622-(*g*, 0) through 622-(*g*, (M−1)) (illustratively 622), all of which may be active simultaneously. Each data write port includes not only a data part and an address part, but also a data valid signal (not shown), and a group member select signal in order to best take advantage of the grouped structure of the memory 114. Through the use of the group member select signal, the ingress apparatus 110 can direct that the data on the data part of any data write port of a group of memory banks, be written to the specified address within any bank member of the group. For example, on data write port 612-(0,0), the group member select signal can specify that the data be written to the specified address within any of the M banks 617 in the group 616-0. A similar capability is provided to the egress apparatus 120 on the data read ports 622. Effectively, therefore, the ingress apparatus 110 and the egress apparatus 120 each have M available paths to write and read data, respectively, to or from a given bank of any given group 616 in the memory 114. This capability effectively multiplies the available data throughput of the memory 114 by a factor of M.

Figure 7A:
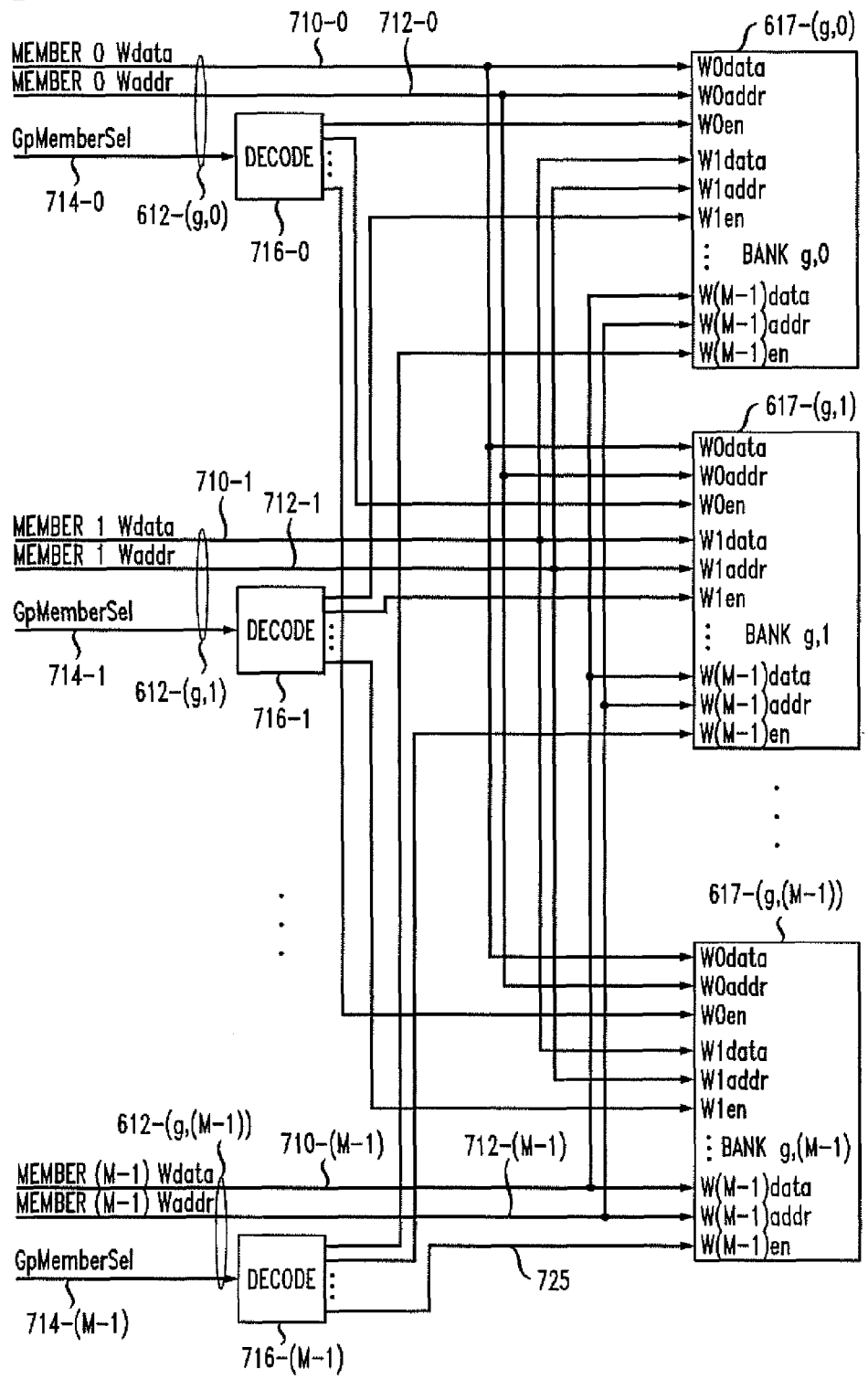
FIGS. 7A and 7B (collectively, FIG. 7) are functional block diagrams illustrating certain internal functions of a memory bank group in FIG. 6 or 8.
Figure 7B:
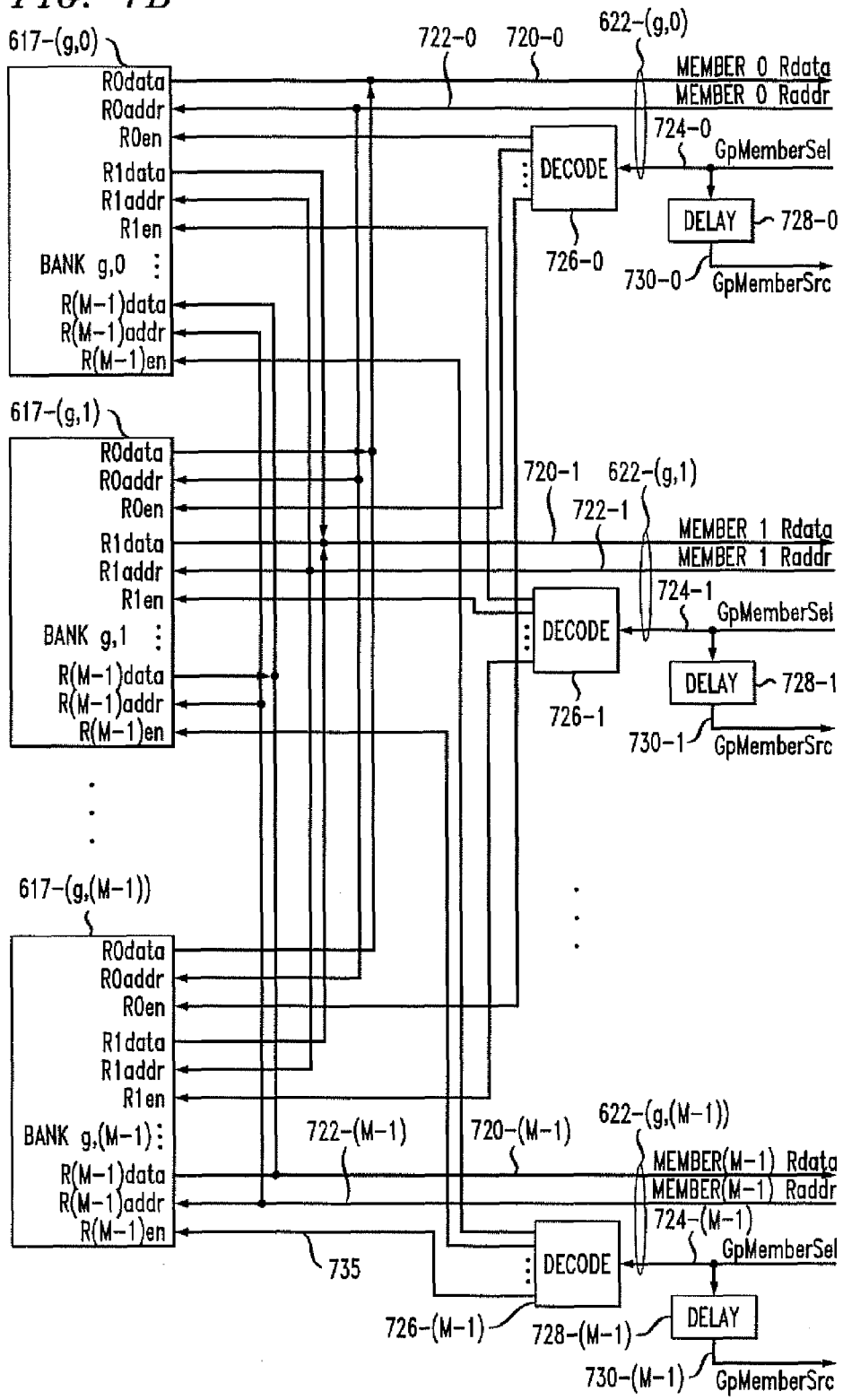

FIGS. 7A and 7B are block diagrams illustrating how a group 616-*g* of banks in the memory 114 can be implemented. FIG. 7A illustrates the data write side of the memory 114, and FIG. 7B illustrates the data read side of the memory 114. Only one group 616-*g* is shown; the other groups 616 are similar. Referring to FIG. 7A, data write port 612-(*g*, 0) contains a member 0 data part 710-0, a member 0 address part 712-0, and a group member selected signal 714-0. Similarly data write port 612-(*g*, 1) contains a member 1 data part 710-1, a member 1 address part 712-1, and a group member selected signal 714-1. The data write port 612-(*g*, (M−1)) contains a member (M−1) data part 710-(M−1), a member (M−1) address part 712-(M−1), and a group member selected signal 714-(M−1). Each of the banks 617 is itself a multi-port memory, containing M data write ports and M data read ports.

Each of the data write ports 612 of each of the banks 617 further includes an enable signal input indicating whether the data and address information on the port are valid. Only those data write ports 612 whose enable lines 725 are asserted will write data into the bank. The address and data parts 710-*j* and 712-*j* of each $j^{th}$ one of the data write ports 612 of the group are connected in common to the address and data parts, respectively, of the $j^{th}$ data write port 612 of all of the banks 617 in the group. The group member select signal 714-*j* of each $j^{th}$ one of the data write ports 612 of the group carries a number ranging from 0 to (M−1), and indicates which of the M bank members is to load in the data from data write port j. Each group member select signal 714-*j* is provided to a respective decoder 716-*j*, which decodes the signal 714-*j* into M separate enable lines 725, only one of which can be asserted at the time. Each decoder 716-*j* also receives a 'valid' signal (not shown), which if unasserted, causes the decoder 716-*j* to unassert all its enable line outputs. Each $b^{th}$ output of each decoder 716-*j* is provided to the enable input of the $j^{th}$ data write port 612 of the $b^{th}$ bank 617-(*g, b*). Thus, data on the data part of each $j^{th}$ data write port 612 of each $b^{th}$ bank member 617 in the group will be written to the address specified on the address lines 712-*j*, but only in the bank specified by the group member select input 714-*j*, and only if the valid signal for port 612-(*g, j*) is asserted.

Referring to FIG. 7B, data read port 622-(*g*, 0) contains a member 0 data part 720-0, a member 0 address part 722-0, and a group member selected signal 724-0. Similarly, data read port 622-(*g*, 1) contains a member 1 data part 720-1, a member 1 address part 722-1, and a group member selected signal 724-1. The data read port 622-(*g*, M−1)) contains a member (M−1) data part 720-(M−1), a member (M−1) address part 722-(M−1), and a group member selected signal 724-(M−1).

Each of the data read ports 622 of each of the banks 617 further includes an enable signal input indicating whether the read address is valid for that data read port 622. Only those data read ports 622 whose enable lines 735 are asserted will assert retrieved data out toward the egress apparatus 120. The address and data parts 720-*j* and 722-*j* of each $j^{th}$ one of the data read ports 622 of the group are connected in common to the address and data parts, respectively, of the $j^{th}$ data read port 622 of all of the banks 617 in the group. The group member select signal 724-*j* of each $j^{th}$ one of the data read ports 622 of the group carries a number ranging from 0 to (M−1), and indicates which of the M bank members is to drive data toward data read port j of the group. Each group member select signal 724-*j* is provided to a respective decoder 726-*j*, which decodes the signal 724-*j* into M separate enable lines 735, only one of which can be asserted at the time. Each decoder 726-*j* also receives a 'valid' signal (not shown), which if unasserted, causes the decoder 726-*j* to unassert all its enable line outputs. Each $b^{th}$ output of each decoder 726-*j* is provided to the enable input of the $j^{th}$ data read port 622 of the $b^{th}$ bank 617-(*g, b*). Thus the $j^{th}$ data read port 622 of only the bank member 617 for whose group member select input 724-*j* is asserted, will drive data from the address specified on the address lines 722-*j* out the data read port 622-(*g, j*), and only if the valid signal for port 622-(*g, j*) is asserted.

The group member select signals 724-*j* are also returned to the egress apparatus 120 as a corresponding group member source signal 730-*j*, with the returning data, so that the transmit port controller 142 receiving the data will know which bank 617 the data actually came from. Each group member source signal 730-*j* is delayed by a respective delay element 728-*j*, equivalent to the time delay of the memory banks 617.

Figure 8:
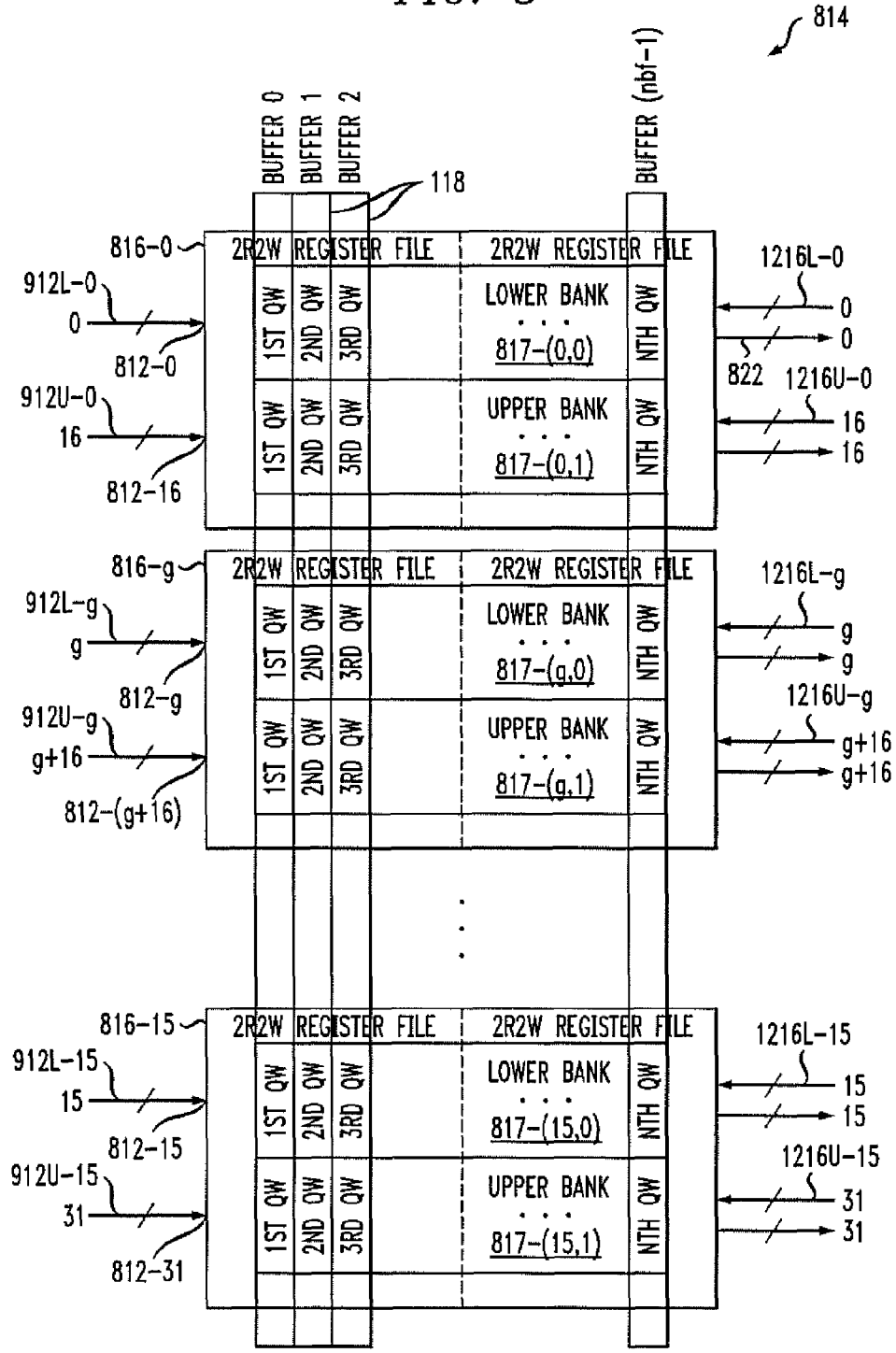
FIG. 8 illustrates a shared memory structure incorporating features of the invention.

An embodiment will now be described in which M=2. Referring to FIG. 8, 16 groups 816 of memory banks 817 are shown, each group 816 containing two banks 817. Each $g^{th}$ group 816-*g* has two data write ports numbered g and g+16, and two data read ports numbered similarly. In general, for N groups of banks and M=2 members in each group, the data read and write ports for the $g^{th}$ group 816-*g* are numbered g and g+N. For convenience, the two members of each group are sometimes referred to herein as a lower member and an upper member, the lower member being the member numbered in the range 0 . . . 15 and the upper member being the member numbered in the range 16 . . . 31.

Each memory bank group 816-*g* contains two data write ports 812-*g* and 812-(*g*+16), also referred to sometimes herein as the lower and upper data write ports, respectively, of memory bank group 816-*g*. Each memory bank group 816-*g* also contains two data read ports 822-*g* and 822-(*g*+16). All the data read and write ports of a given memory bank group 816 may be active simultaneously. Each data write port includes not only a data part and an address part, but also a data valid signal (not shown) and a group member select signal, which selects whether the data write port is to execute its data write request on the lower or upper bank of the group 816. Similarly, each data read port includes a group member select signal that selects whether the data read port 822 is to retrieve the requested data from the lower or upper bank of the group 816. Effectively, therefore, the ingress apparatus 110 and the egress apparatus 120 each have two (one primary and one alternate) available routes (one primary and one alternate) to write and read data, respectively, to or from a given bank of any given group 816 in the memory 114. This capability effectively doubles the available data throughput of the memory 114.

Ingress Apparatus

Figure 9:
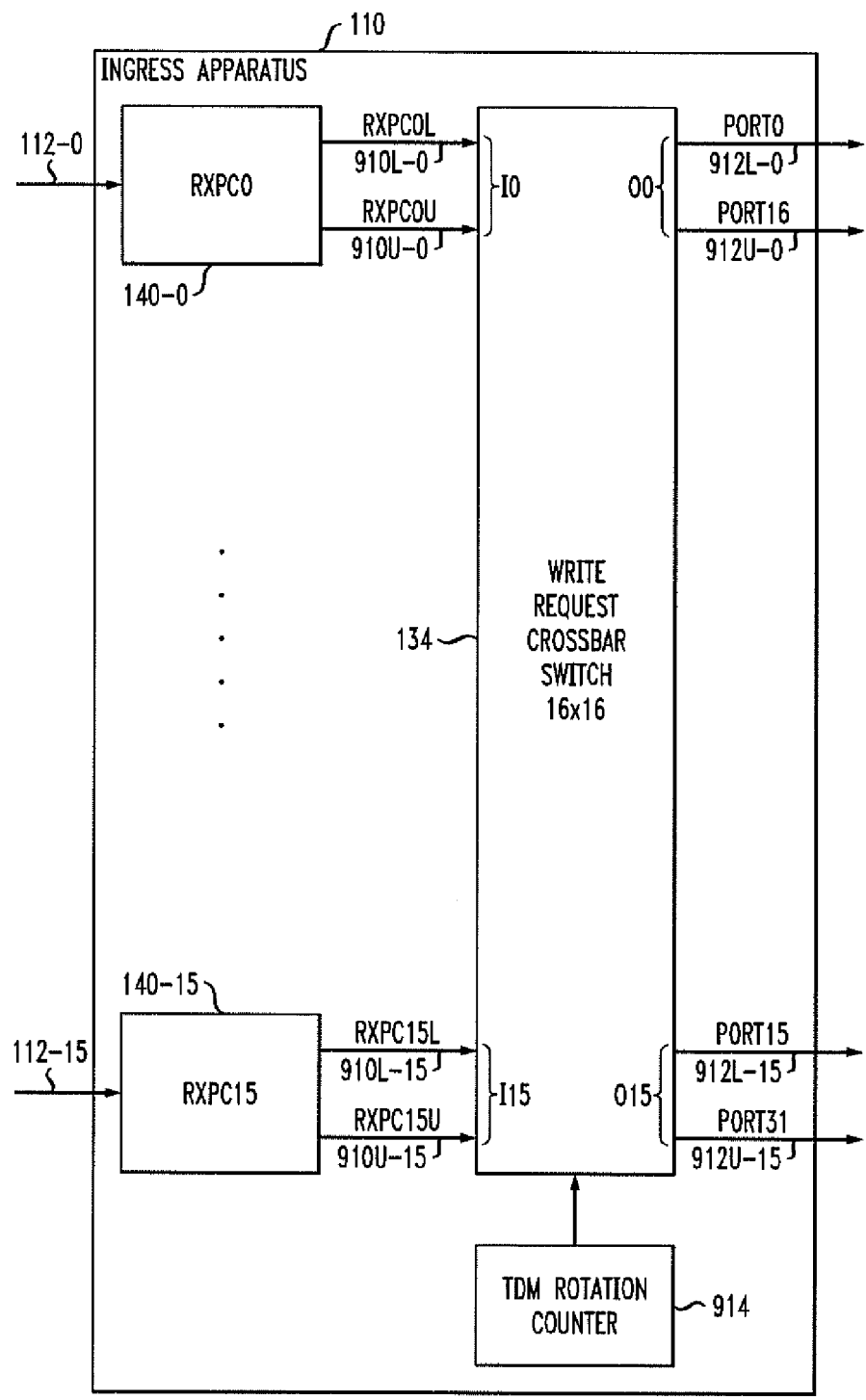
FIG. 9 illustrates ingress apparatus for use with the shared memory structure of FIG. 8.

FIG. 9 is an overall block diagram of an ingress apparatus 110 for use with the M=2 embodiment of FIG. 8. It includes 16 RXPCs 140 and the write request crossbar switch 134. Each RXPC has two write request paths 910L and 910U, referring to the lower and upper data write ports of a group 816 of memory banks 817 (FIG. 8). The write request crossbar switch 134 has 16 input ports I0-I15, each of which is connected to receive the pair of write request paths from a corresponding one of the RXPCs 140. It will be seen that each of the write request paths 910L or 910U in the present embodiment carries a 64-bit data unit, a buffer number address, one bit to indicate the most significant bit (MSB) of the bank counter within the RXPC 140, and one bit to indicate validity.

The write request crossbar switch 134 also has 16 output ports O0-O15. As with the write request crossbar switch input ports, each write request crossbar switch output port carries two 77-bit write request paths 912L and 912U, for a total of 154 bits in the present embodiment. The two write request paths 912 from each write request crossbar switch output port are provided to the two respective data write ports of the corresponding group 816 of memory banks 817 in the shared memory 814. With reference to the numbering of ports and banks as shown in FIG. 8, each path 912L-$i$ is connected to the data write port $i$ in the shared memory 814, and each path 912U-$i$ is connected to the data write port $i+16$ in the shared memory 814. More generally, if there are N write request crossbar switch output ports, each containing M write request paths 912, and if there are N groups 816 of memory each containing M banks 817, then each $j^{th}$ path 912 of each $i^{th}$ write request crossbar switch output port, is connected to the $(i+N*j)^{th}$ data write port of shared memory 814, $i=0 \ldots (N-1)$ and $j=0 \ldots (M-1)$.

In operation, the write request crossbar switch 134 routes the information on its input ports to its output ports in a sequence that rotates cyclically for each clock pulse. For clock pulse 0, for example, the write request crossbar switch 134 routes each $i^{th}$ one of its input ports to the corresponding $i^{th}$ one of its output ports. For clock pulse 1, the write request crossbar switch 134 routes each $i^{th}$ one of its input ports to the $(i+1)^{th}$ one of its output ports, except that input port I15 is connected to output port O0. Stated generally, for N input and N output ports of the write request crossbar switch 134, for each $k^{th}$ time slot, the switch 134 routes its $i^{th}$ input port to its $\{(i+k) \bmod 16\}^{th}$ output port. Stated more generally, for N RXPCs 140 each having M write request paths 910, and for N groups 816 of M memory banks 817 each, and for each $k^{th}$ time slot, the write request crossbar switch 134 routes each $j^{th}$ write request output of each $i^{th}$ RXPC 140 to the $\{\{(i+k) \bmod N\}+N*j\}^{th}$ data write port of the shared memory 814.

The time slots k are identified to the write request crossbar switch 134 by a TDM rotation counter 914. The write request crossbar switch 134 itself operates in a pipelined manner in the present embodiment, such that information that appears on its inputs in time for one clock pulse does not appear on its outputs until four clock pulse is later. Nevertheless, the information provided at the input ports of the write request crossbar switch 134 is provided "for" the $k^{th}$ time slot as measured at the data write ports of the memory 114.

Receive Port Controller

Figure 10:
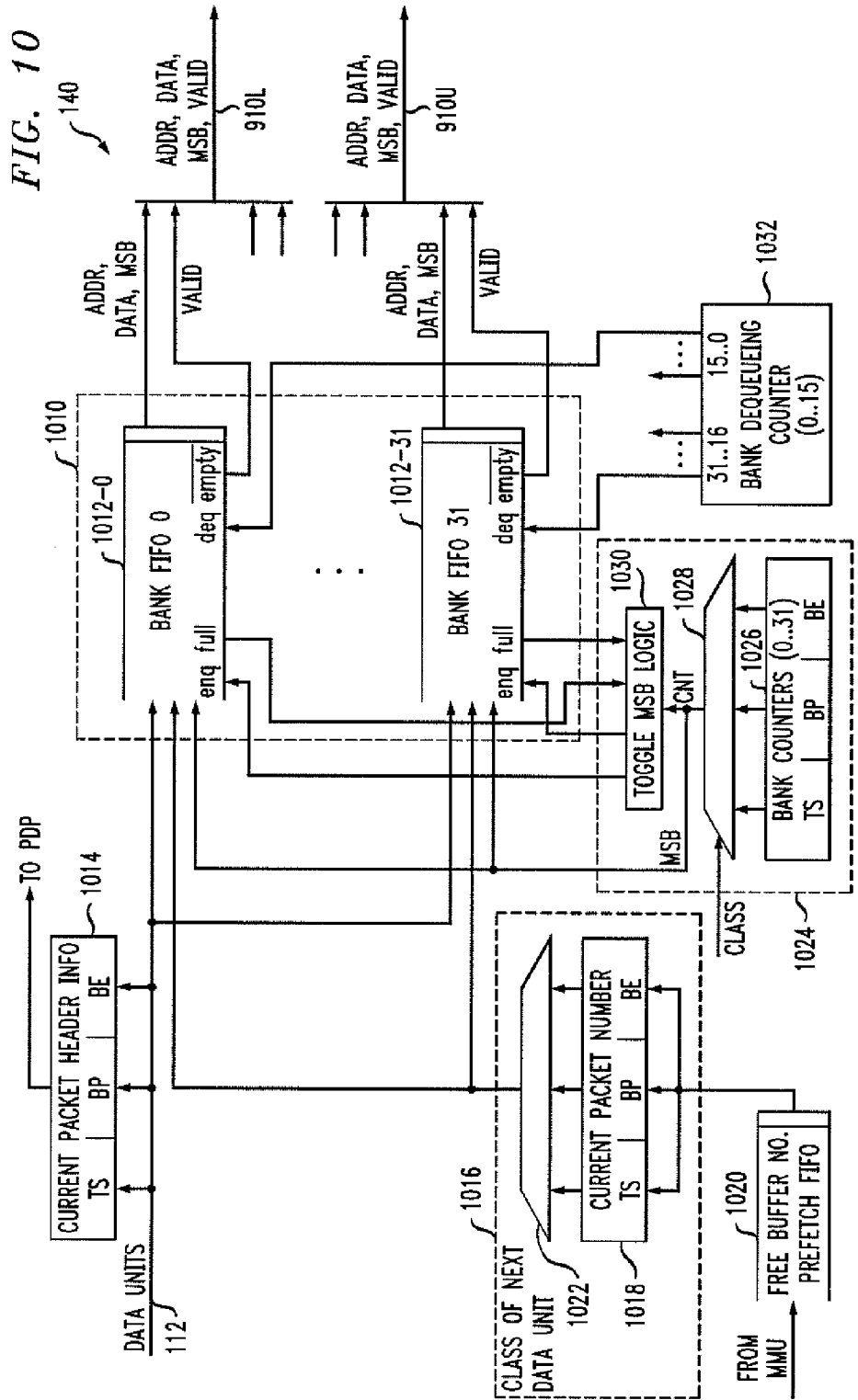
FIG. 10 illustrates a receive port controller of FIG. 9.

FIG. 10 is a functional block diagram of one of the RXPCs 140 (FIG. 9). The data units incoming from a fabric input port 112 are provided to an array 1010 of bank FIFOs 1012. There are 32 bank FIFOs 1012 in the embodiment of FIG. 10, one corresponding to each data write port 812 of the shared memory 814. In the embodiment of FIG. 10, write requests written into each $j^{th}$ one of the bank FIFOs 1012 will eventually be executed by the $j^{th}$ data write port 812-$j$ of the shared memory 814, and the write request contains an indication of whether such data write port 812 should write the data into the lower or upper bank of the group 816. The data units from the fabric input port 112 are also provided to a current buffer header information store 1014, for storing information from the header of the incoming data packet for eventual transmission to the PDP 126 (FIG. 1). In the present embodiment, up to three incoming data packets can be interleaved together, one corresponding to each of the three supported classes of service: time sensitive (TS), bandwidth provisioned (BP), and best efforts (BE), in order of decreasing priority. Interleaved packets arise from preemption of a data packet in a lower priority class by data packets in a higher priority class. No more than three interleaved data packets are possible at once since the environment is defined such that no data packet can preempt another data packet of its own class.

The RXPC 140 also includes an address generator 1016, which provides a buffer number address to be written into the bank FIFOs 1012 as part of each write request. The address generator 1016 includes three registers 1018 for storing up to three current buffer numbers allocated to the RXPC 140. Again, since up to three interleaved packets may be incoming at a time, only three current buffer numbers need be stored in registers 1018. Newly allocated buffer numbers are written to the appropriate current buffer number register 1018 from the head of a free buffer number prefetch FIFO 1020, which is filled from the tail by the MMU 128. Based upon the class of the data packet containing each next data unit incoming from the fabric input port 112, a multiplexer 1022 selects the proper current buffer number for writing into the current bank FIFO 1012 in correspondence with the data unit.

RXPC 140 also includes bank enqueuing select logic 1024, which keeps track of each next bank FIFO 1012 into which incoming data units should be written. Again, three separate bank counters, one for each potentially pending interleaved packet, are maintained in the bank counters 1026. A multiplexer 1028 selects the count that is proper for the class of the data packet currently being received. Each of the bank counters 1026 operates independently, each keeping a current bank number count for a corresponding one of the three allocated buffer numbers in the current buffer number registers 1018. When one of the bank counters 1026 wraps around to point again to bank FIFO 0, the current buffer number register 1018 corresponding to that bank counter loads in a new allocated buffer number from the buffer number prefetch FIFO 1020. Thus, in an example incoming data stream in which a second data packet interrupts a first, and then the first resumes thereafter, the RXPC 140 will write sequential data units of the first data packet into bank FIFOs 1012 according to a first sequence of the bank FIFOs 1012, dependent upon the first bank counter 1024, and will then write sequential data units of the second data packet into bank FIFOs 1012 according to a second sequence of the bank FIFOs 1012 dependent upon the second bank counter 1024. Then when the first data packet resumes, the RXPC 140 will resume writing further sequential data units of the first data packet into the bank FIFOs 1012 according to the first sequence of the bank FIFOs 1012. Resumption will occur according to the next sequential bank number after the last data unit prior to the interruption, and unless that data unit coincided with the end of the buffer, it will also be written in conjunction with the same buffer number address. Interleaving by a third data packet operates similarly.

The counters 1026 count through all 32 of the bank FIFOs 1012 cyclically, but in order to take advantage of the two paths available for write request to any given bank 817 of the memory 814, the bank enqueuing select logic 1024 also has the ability to enqueue an incoming data unit into the bank FIFO 1012 for the alternate path if the bank FIFO 1012 for the primary paths is fill. Thus, bank enqueuing select logic includes toggle MSB logic 1030. Toggle MSB logic 1030 receives the count output of multiplexer 1028, and also a "full" signal from each of the bank FIFOs 1012. If the bank FIFO 1012 to which the bank counter 1026 is currently pointing is full, then the toggle MSB logic 1030 toggles the most significant bit of the count to determine the bank FIFO 1012 in which to enqueue the current incoming data unit. Toggling the high-order bit of the count is the same as adding 16 to the count and taking modulo 16 of the result. Thus, if the current count is 6, but bank FIFO 1012-6 is full, then the bank enqueuing select logic 1024 will instead select bank 1012-22 to store the data unit. The depth of the bank FIFOs 1012 is chosen such that it is not possible for both the primary and alternate bank FIFOs 1012 to be full. The bank enqueuing select logic 1024 always prefers the primary bank FIFO 1012 for a given count rather than the alternate bank FIFO 1012, even for counts in the range of 16 . . . 31, although a different embodiment need not incorporate that preference.

In order to ensure that data units that are enqueued into alternate bank FIFOs 1012 nevertheless get written into the proper memory bank 817 in the memory 814, the bank enqueuing selection logic 1024 also writes into the selected bank FIFO 1012 the MSB of the count output of multiplexer 1028, prior to any toggle. This bit is written to the bank FIFO in conjunction with the data unit and buffer number, and is carried through the write request crossbar switch 134 to the corresponding data write port of the memory 814. At the memory 814, this bit acts as a group member selection signal for selecting into which bank 817 of the group 816 the data is to be written. If the MSB was 0, then the data will be written into the lower bank of the group regardless of which data write port of the group received the request. If the MSB was 1, then the data will be written into the upper bank of the group regardless of which data write port of the group received the request. It is possible that the group member selection signals received on both ports of a group point to the same bank in a group. In this case, the write address will differ and the 2-write-port bank memory will be able to execute both write requests simultaneously.

Generalizing the RXPC 140 of FIG. 10, and referring to the shared memory structure of FIG. 6, in an embodiment having N groups 616 of M members 617 of banks each in the memory 114, the RXPC 140 can contain a set of M*N bank FIFOs 1012. The bank counters 1026 would typically cycle through all M*N bank FIFOs 1012 in the set, but the bank enqueuing select logic would have the capability to write the incoming data unit (and the current buffer number) into the bank FIFO 1012 corresponding to any of the M write request ports of the group 616 containing the bank 617 indicated by the bank counter 1026. Stated another way, the bank FIFO array 1010 contains M bank FIFOs 1012 in each of N groups of bank FIFOs. All of the bank FIFOs 1012-$(i+N*j)$ are members of the i'th group of bank FIFOs, $i=0\ldots(N-1)$ and $j=0\ldots(M-1)$. When the current count from the relevant bank counter 1026 is i, the bank enqueuing select logic 1024 is able to write the current data unit and its corresponding buffer address into any bank FIFO 1012 in the i'th group of bank FIFOs. The higher-order bits of the current count are written into the selected bank FIFO 1012 in conjunction with the data unit and buffer number address, to indicate which bank member 617 of bank group 616-$i$, is to receive the data unit.

Returning to FIG. 10, the bank FIFOs 1012 are dequeued in strict numerical sequence cycling from 0 . . . 15. A bank dequeuing counter 1032 provides the current dequeuing count. Two banks are dequeued at the same time: the bank number specified by the bank dequeuing counter 132, and 16 plus that bank number. The RXPC 140 can be thought of as having two data selectors, one for selecting write request information from among bank FIFOs 1012-0 through 1012-15 (the low order bank FIFOs), and the other for selecting write request information from among bank FIFOs 1012-16 through 1012-31 (the higher-order bank FIFOs). Both data selectors are responsive to the same bank dequeuing counter 132. The dequeued write request information from the selected low order bank FIFO 1012-0 . . . 15 includes a data unit, a buffer number address at which the data unit is to be written within a memory bank 817, and the counter MSB indicating which bank 817 within the designated group 816 of memory 814 the data is to be written to. This information is carried on write request path 910L to the shared memory 814. The dequeued write request information from the selected high order bank FIFO 1012-16 . . . 31 includes the same information, and is carried on write request path 910U to the shared memory 814. In both cases, if the selected bank FIFO 1012 is empty, then the address, data and MSB information is meaningless and a valid bit, carried with the write request information, is unasserted.

Again generalizing and referring to the shared memory structure of FIG. 6, in an embodiment having N groups 616 of M members 617 of banks in the memory 114, the RXPC 140 contains M data selectors, one for each bank member in a group. The RXPC 140 also contains a dequeuing counter 132 which cycles through all of the groups 0 . . . (N−1) for successive time slots. For each count value k, each $j^{th}$ data selector selects for dequeuing, bank FIFO 1012-$(k+N*j)$, $j=0 \ldots (M-1)$.

Because of the cyclically staggered multiplexing of the write request crossbar switch 134 (FIG. 9), the group of bank FIFOs 1012 which each RXPC-$i$ must dequeue for a particular time slot k, is one higher than the group of bank FIFOs 1012 that is being dequeued for RXPC-(i−1) for time slot k. In general, for each $k^{th}$ time slot, the low order data selector of each $i^{th}$ RXPC 140 selects for dequeuing the $\{(i+k) \bmod N\}$'th bank FIFO 1012, and the write request crossbar switch 134 routes the read request information thus selected to the corresponding $\{(i+k) \bmod N\}$'th data write port of the shared memory 114. In addition, where memory banks are paired as in FIG. 8, for each k'th time slot, a high order data selector of each i'th RXPC 140 selects for dequeuing the $\{N+(i+k) \bmod N\}$'th bank FIFO 1012, and the write request crossbar switch 134 routes the write request information thus selected to the corresponding $\{N+(i+k) \bmod N\}$'th data write port of the shared memory 114. More generally, where a group of memory banks includes M banks, the j'th data selector of each i'th RXPC 140 selects for dequeuing the $\{j*N+(i+k) \bmod N\}$'th bank FIFO 1012, and the write request crossbar switch 134 routes the read request information thus selected to the corresponding $\{j*N+(i+k) \bmod N\}$'th data write port of the shared memory 114. Thus, each bank FIFO 1012 in a given RXPC 140 corresponds to a single, fixed data write port of the shared memory 814.

The use of a set of bank FIFOs 1012 to store write requests, each corresponding to a different one of the data write ports of the memory 814, facilitates the reordering of the units incoming on fabric input port 112 in interleaved data packets such that they can be written into contiguous banks of a buffer (or of a linked sequence of buffers) using a high-speed, efficient, TDM data write port arbitration scheme. Thus, incoming data packets, which might be interleaved with each other in the incoming data stream, are re-assembled by the RXPC bank FIFO mechanism and written into contiguous banks in a sequence of one or more linked buffers in the shared memory 114. It will be appreciated that in an environment in which incoming data packets cannot be interleaved with each other, it may not be necessary to include as many bank FIFOs 1012. A single input FIFO might be sufficient. Where there are two write request paths to each bank of memory, some embodiments might include two input FIFOs.

Figure 11:
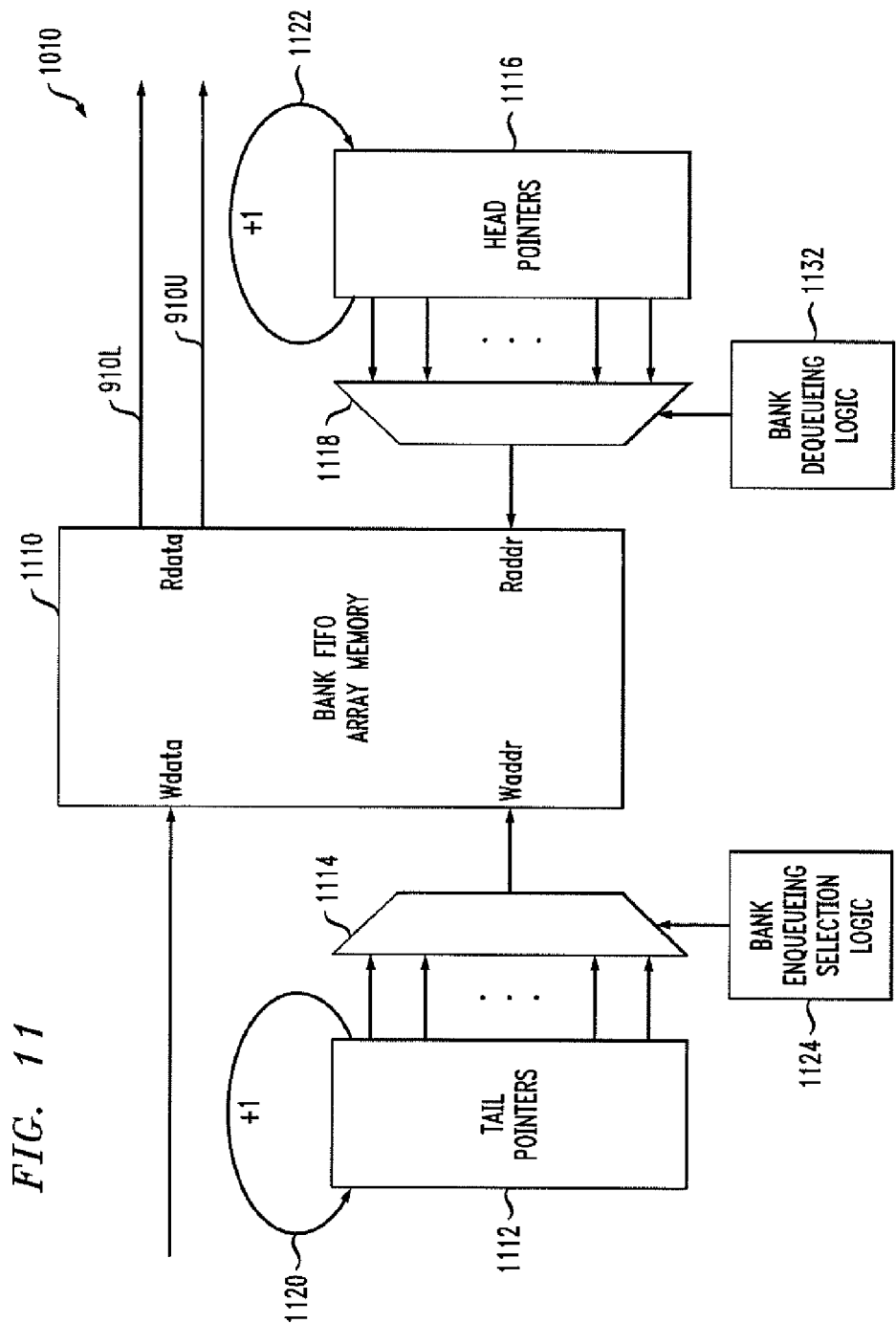
FIG. 11 illustrates an exemplary implementation of the bank FIFO array of FIG. 10.

As mentioned, the diagram of FIG. 10 represents only the logical functionality of an RXPC 140, and a number of different implementations are possible. For example, the array 1010 of bank FIFOs 1012 can be implemented as a single dual port (one write and one read port) addressable memory. FIG. 11 is a functional block diagram illustrating pertinent features of such an implementation. Referring to FIG. 11, the bank FIFO array 1010 (FIG. 10) includes a one read port-one write port bank FIFO array memory 1110. The memory 1110 is divided into 16 segments, each segment containing the entries for one pair of the bank FIFOs 1012-$j$ and 1012-($j$+16), $j$=0 . . . 15. Each segment is sufficiently large to hold four write request entries shared between the two bank FIFOs of the pair. The FIFO array 1010 also includes a set of tail pointers 1112, the current values of which are selected to the write address part of the data write port of the bank FIFO array memory 1110 by a multiplexer 1114 under the control of bank enqueuing selection logic 1124. The write request information, including a data unit, a buffer number, and a bank counter MSB, are provided to the data part of the data write port of bank FIFO array memory 1110. On the read side, the FIFO array 1010 includes a set of head pointers 1116, the current values of which are selected to the address part of the data read port of the bank FIFO array memory 1110 by a multiplexer 1118 under the control of bank dequeuing logic 1132. Both the tail pointers 1112 and the head pointers 1116 include pointer incrementing features 1120 and 1122, respectively. The data part of the data read port of the bank FIFO array memory provides the write request information from the two selected bank FIFOs 1012 toward the shared memory 814 on both the lower and upper paths 910L and 910U. Many other implementations will be apparent.

Egress Apparatus

Figure 12:
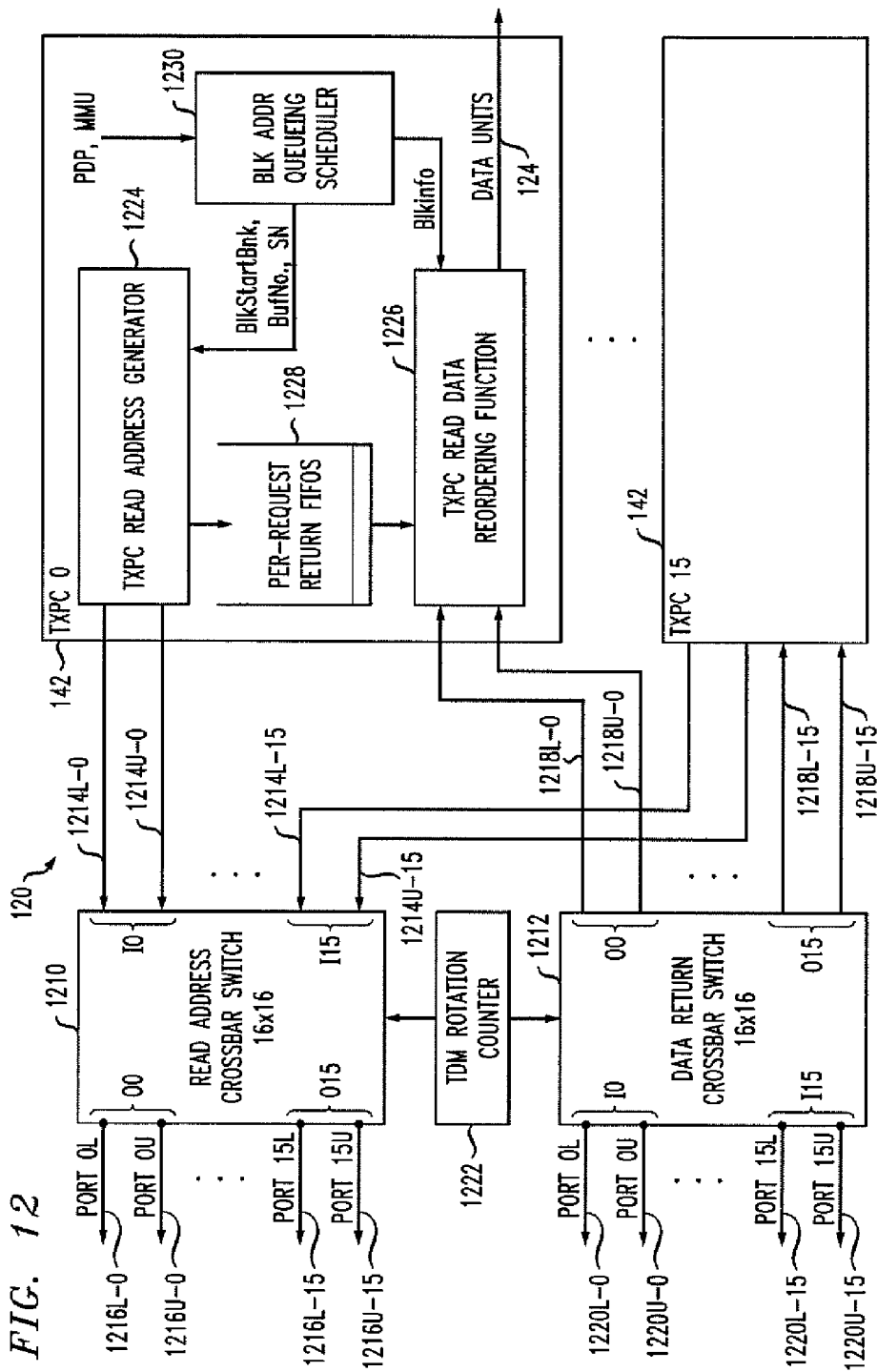
FIG. 12 illustrates an egress apparatus for use with the shared memory structure of FIG. 8.

FIG. 12 is an overall block diagram of an egress apparatus 120 for use with the M=2 embodiment of FIG. 8. It includes 16 TXPCs 142, a read address crossbar switch 1210 and a data return crossbar switch 1212. The address and data crossbar switches 1210 and 1212 must be at least logically separate on the egress side (although they may be implemented together) because data read requests and the return data from such read requests travel in opposite directions and are separated in time. Each TXPC 142 has two read requests paths 1214L and 1214U, referring to the lower and upper members of a group 816 of data read ports of the memory 814 (FIG. 8). The read address crossbar switch 1210 has 16 input ports I0-I15, each of which is connected to receive the pair of read requests paths from a corresponding one of the TXPCs 142. It will be seen that each of the read requests paths 1214L or 1214U in the present embodiment carries a buffer number, plus the MSB of a TXPC dequeuing bank counter. Each read address crossbar switch 1210 input port receives two of the read requests paths.

The read address crossbar switch 1210 also has 16 output ports O0-O15 each carrying two read requests paths 1216L and 1216U, for a total of 24 bits in the present embodiment. The two read requests paths from each read address crossbar switch output port are provided to the two respective data read ports of the corresponding group 816 of memory banks 817 in the shared memory 814. With reference to the numbering of ports and banks as shown in FIG. 8, each read request address path 1216L-$i$ is connected to the address part of the data read port $i$ of the shared memory 814, and each read requests address path 1216U-$i$ is connected to the address part of the data read port $i$+16 of the shared memory 814. More generally, if there are N read address crossbar switch output ports, each containing M read request address paths 1216, and if there are N groups 816 of memory each containing M banks 817, then each $j^{th}$ path 1216 of each $i^{th}$ read address crossbar switch output port is connected to the address part of the $(i+N*j)^{th}$ data read port of shared memory 814, $i$=0 . . . (N−1) and $j$=0 . . . (M−1).

Each TXPC 142 also has two data return paths 1218L and 1218U, again referring to the lower and upper members of a group 116 of data read ports of the memory 114. The data return crossbar switch 1212 has 16 output ports O0-O15, each of which includes two data return paths. Each data return path in the present embodiment carries a 64-bit data unit plus a bank counter MSB. The data return crossbar switch 1212 also has 16 input ports I0-I15 each carrying the return data for two read requests on respective paths 1220L and 1220U. The two return data paths of each data return crossbar switch input port are connected to the data parts of two respective data read ports of the corresponding group 816 of memory banks 817. Again with reference to the numbering of ports and banks as shown in FIG. 8, each data return path 1220L-$i$ is connected to the data part of the data read port $i$ of the shared memory 814, and each data return path 1220U-$i$ is connected to the data part of the data read port $i$+16 of the shared memory 814. Generalizing further as shown in FIG. 6, if there are N data return crossbar switch input ports, each containing M data return paths, and if there are N groups 616 of memory each containing M banks 617, then each $j^{th}$ data return path of each $i^{th}$ data return crossbar switch input port is connected to the data part of the $(i+N*j)^{th}$ data read port of shared memory 614, $i$=0 . . . (N−1) and $j$=0 . . . (M−1).

In operation, the read address crossbar switch 1210 routes read requests from its input ports to its output ports in a sequence that rotates cyclically for each clock pulse. Stated generally, for N input and N output ports of the read address crossbar switch 1210, and for each $k^{th}$ time slot, the read address crossbar switch 1210 routes its $i^{th}$ input port pair to its $\{(i+k) \bmod 16\}^{th}$ output port pair. Stated more generally, for N TXPCs 142 each having M read request paths 1214, and for N groups 616 of M memory banks 617 each, and for each $k^{th}$ time slot, the read address crossbar switch 1210 routes each $j^{th}$ read requests output of each $i^{th}$ TXPC 142 to the address part of the $\{\{(i+k) \bmod N\} + N*j\}^{th}$ data read port of the shared memory 814.

The data return crossbar switch 1212, in operation, routes return data in from its input ports to its output ports in a similar sequence rotating cyclically for each clock pulse. For N TXPCs 142 each having M return data paths 1218, and for N groups 616 of M memory banks 617 each, and for each $k^{th}$ time slot, the data return crossbar switch 1212 routes to each $j^{th}$ data return input of each $i^{th}$ TXPC 142, the data part of the $\{\{(i+k) \bmod N\} + N*j\}^{th}$ data read port of the shared memory 614.

As on the ingress side, the time slots k are identified to the read address crossbar switch 1210 and the data return crossbar switch 1212 by a TDM rotation counter 1222. In one embodiment, two separate rotation counters 1222 are used, one for each of the two crossbar switches 1210 and 1212. In another embodiment, most useful where data is returned from the shared memory always at a fixed number of clocks after the corresponding read requests are transmitted to the memory, a single rotation counter 1222 can be used, with k as provided to the data return crossbar switch lagging k as provided to the read address crossbar switch 1210 by the fixed number of clock cycles. In addition, the rotation counter 1222 might be the same as the rotation counter 914 in the ingress apparatus 110 in one embodiment, or they might be separate counters in another embodiment. As with the write request crossbar switch 134, the read address crossbar switch 1210 and the data return crossbar switch 1212 both operate in a pipelined manner in the present embodiment.

Transmit Port Controller

Each TXPC 142 includes a block address queuing scheduler 1230, which receives packet transmit instructions from the PDP 126 and converts them to block data read requests. The scheduler 1230 prefetches two descriptors for each class of service from the PDP 126. When a per-class descriptor is empty or exhausted, the next descriptor is dequeued from the prefetch area. Each packet descriptor includes the starting buffer address, starting bank number, packet length and class of services, among other things. As the scheduler 1230 schedules blocks to be retrieved in accordance with one of the packet descriptors, it also updates internal registers maintaining the remaining length and next bank number. The scheduler 1230 also queries the MMU 128 with current buffer number addresses to pre-fetch the next buffer number for each packet from the buffer linkage list 416 (FIG. 4).

The block address queuing scheduler 1230 collects per-class information to select which block to read next. The scheduler 1230 chooses a packet descriptor out of the three classes based on several factors including class priority, whether there is a packet descriptor pending for a particular class, and whether the bank request FIFO (described below) for the first required memory bank for a particular candidate packet descriptor is already full. After choosing a packet from which to schedule the next block, the scheduler 1230 tags a two-bit sequence number (SN) onto the block. Since each bank access can be requested through two separate data requests paths, it is possible for requested data to be returned from the memory 814 out-of-order. A 2-bit request sequence number is sufficient to facilitate reordering of this data. The scheduler 1230 forwards the starting bank number of the next block to be requested, the buffer number in which to find the block, the pre-fetched next linked buffer number in case it is needed, and the sequence number to be associated with at least the first data unit of the block, to a TXPC read address generator 1224. The scheduler 1230 also forwards certain block information, including packet header information and the sequence number, to a TXPC read data reordering function 1226 to assist in properly reordering return data.

The TXPC read address generator 1224 contains 32 bank request FIFOs, and enqueues up to 8 memory read requests in response to each block read requests received from the block address queuing scheduler 1230. The bank request FIFOs are dequeued and transmitted through the read address crossbar switch 1210 toward the shared memory 814. The read address generator 1224 also transmits certain information toward the TXPC read data reordering function 1226 via a fixed-delay per-request return FIFO 1228 such that it reaches the TXPC read data reordering function 1226 in coordination with the return data unit to which it pertains. The TXPC read data reordering function 1226 receives the data units returned from the memory 814, reorders them as necessary, and transmits them out the fabric output port 124 of the particular TXPC.

Figure 13:
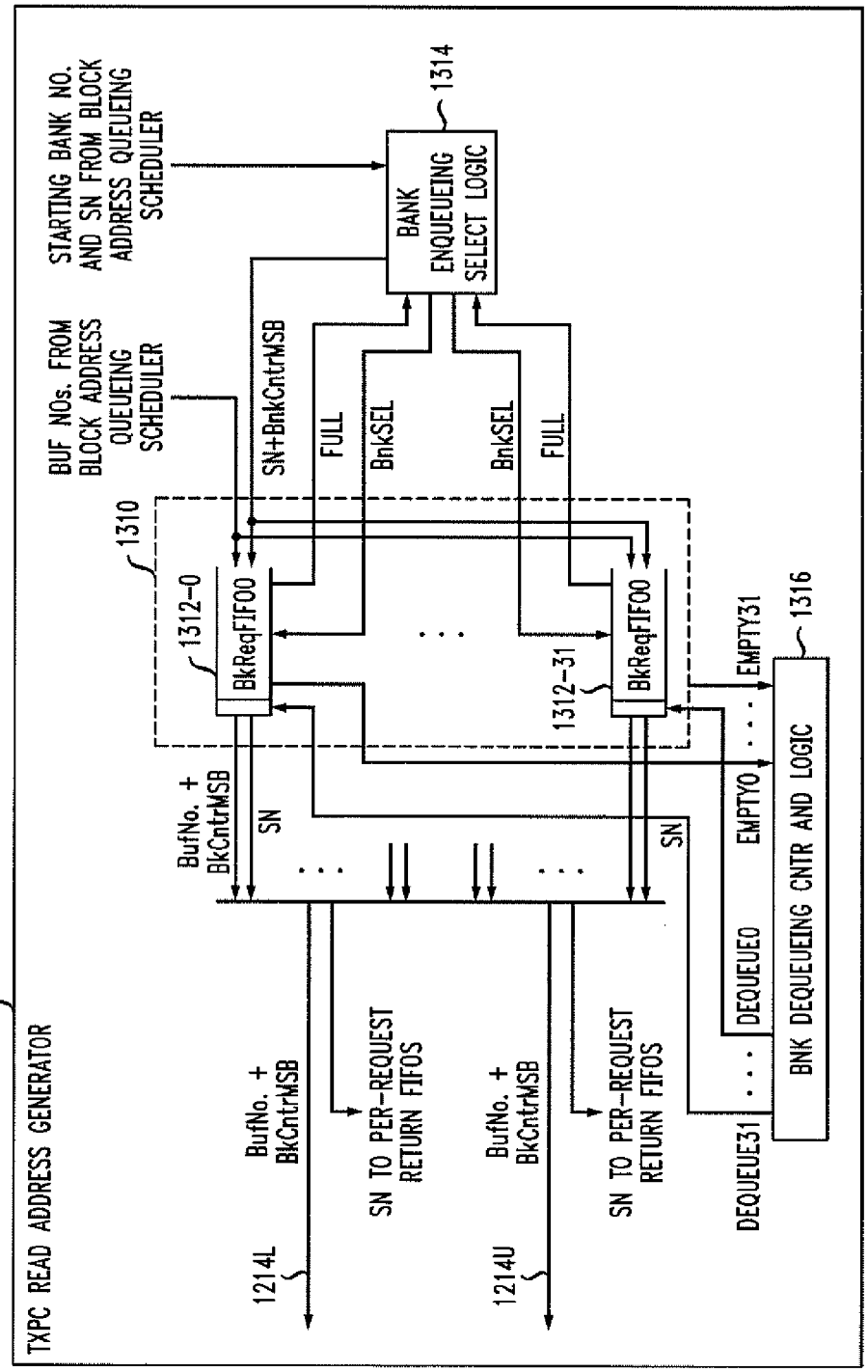
FIG. 13 illustrates a transmit port controller read address generator of FIG. 12.
Figure 14:
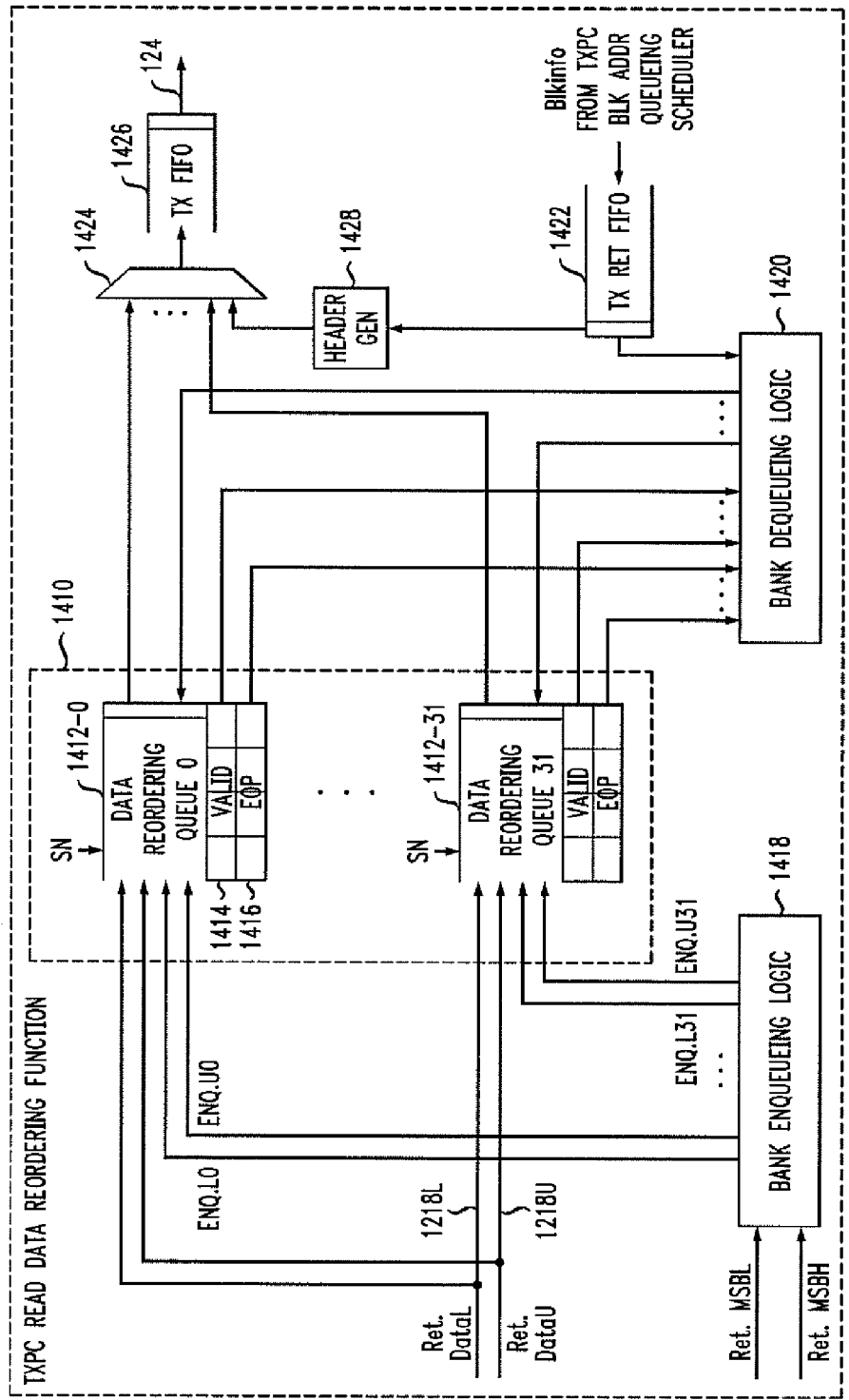
FIG. 14 illustrates a transmit port controller read data reordering function of FIG. 12.

FIG. 13 is a functional block diagram of TXPC read address generator 1224. In many ways the operation of this unit is similar to that of the RXPCs 140. The TXPC read address generator 1224 includes an array 1310 of bank request FIFOs 1312. As with the bank FIFO array 1010 in the RXPCs 140, the array 1310 of bank request FIFOs can be implemented as a single addressable memory divided into 16 segments, each segment containing entries corresponding to one pair of the bank request FIFOs 1312. Each segment is sufficiently large to hold four read requests shared between the two bank request FIFOs of the pair. As with the RXPCs 140, there are 32 bank request FIFOs 1312 in the embodiment of FIG. 13, one corresponding to each data read port of the shared memory 814. Data read requests written into each $j^{th}$ one of the bank request FIFOs 1312 will eventually be routed to the $j^{th}$ data read port of the shared memory 814, and the read requests will contain an indication of whether such data read port should retrieve the data from the lower or upper bank of the group 816.

TXPC read address generator 1224 also includes bank enqueuing select logic 1314, which keeps track of each next bank request FIFO 1312 into which read requests should be written. The bank enqueuing select logic 1314 includes a bank counter which is loaded from the starting bank number provided by the block address queuing scheduler 1230, and which increments for up to 8 sequential bank numbers in the range 0 . . . 31. Data read requests will include the starting buffer address as provided by the block address queuing scheduler 1230 until the current bank number wraps around to bank 0, after which they will include next linked buffer address as provided by the block address queuing scheduler 1230. As with the RXPCs 140, in order to take advantage of the two paths available for read requests to any given bank 817 of the memory 814, the bank enqueuing select logic 1314 also has the ability to enqueue read requests into the bank request FIFO 1312 for the alternate path if the bank request FIFO 1312 for the primary path is full. Thus, like the RXPCs 140, the bank enqueuing select logic 1314 can toggle the MSB of the current bank counter value based on whether the bank request FIFO corresponding to the current counter value is full.

On each clock, the read address generator 1224 writes into the bank request FIFO 1312 selected by the bank enqueuing select logic 1314, the current buffer number (or the next linked buffer number, if after the bank count has wrapped around from the block address queuing scheduler 1230), as well as the bank counter MSB prior to any toggling. As on the ingress side, the bank counter MSB will be carried through the read address crossbar switch 1210 (FIG. 12) to the corresponding data read port of the memory 814, where it will act as a group member selection signal for selecting from which bank 817 of the group 816 the data is to be read. TXPC read address generator 1224 also writes a sequence number into the selected bank request FIFO 1312 in correspondence with each read requests. The first of the sequence numbers will be the same as the sequence number provided in the block information that the block address queuing scheduler 1230 provided to the TXPC read data reordering function 1226, but subsequent sequence numbers can differ.

The enqueuing portion of TXPC read address generator 1224 can be generalized in the same manner as the enqueuing portion of RXPCs 140 of FIG. 10, to an embodiment having N groups 616 of M members of 617 of banks in the memory 114 (FIG. 6). The bank counter in bank enqueuing select logic 1314 would typically cycle through all M*N bank request FIFOs 1312 in the set, but the bank enqueuing select logic would have the capability to write read requests into the bank request FIFO 1312 corresponding to any of the M data read ports of the groups 616 containing the bank 617 indicated by the bank counter. The high order bits of the current count are written into the selected bank request FIFO 1312 in conjunction with the read request, to indicate which bank member 617 of the bank group, is to respond to the read requests.

Returning to FIG. 13, the bank request FIFOs 1312 are dequeued in strict numerical sequence cycling from 0 . . . 15. Bank dequeuing counter and logic 1316 provides the current dequeuing count. Two bank request FIFOs 1312-$i$ and 1312-($i$+16) are dequeued at the same time, except that the bank dequeuing counter and logic 1316 does not dequeue a bank request FIFO 1312 which is empty. The read request from the selected one of the low order bank request FIFOs 1312-0 through 1312-15 is output toward the read address crossbar switch 1210 on read request path 1214L, and the read request from the selected one of the high order bank request FIFOs 1312-16 through 1312-31 is output toward the read address crossbar switch 1210 on read request path 1214U. These read requests include the buffer number and the bank counter MSB that had been enqueued into the bank request FIFO 1312 in conjunction with the buffer number. The sequence number that was also enqueued in conjunction with the buffer number is now forwarded toward the per-request return FIFOs 1228 (FIG. 12). Note that is possible that the two requests issued simultaneously from the TXPC read address generator 1224 both request data from the same memory bank 817, though from different addresses in that bank. In this case, the two sequence numbers will differ and the TXPC read data reordering function 1226 will be able to distinguish them on that basis. As with the enqueuing function, the dequeuing function of TXPC read address generator 1224 also can be generalized in the same manner as the dequeuing function of the RXPCs 140.

The per-request return FIFOs 1228 include a separate FIFO for each of the bank request FIFOs 1312. Each entry in these FIFOs stores the sequence number of the request, and a bit indication of whether the data unit of the request constitutes the end of the packet (EOP). Each per-request return FIFO introduces a delay of a fixed number of clock cycles equal to the number of clock cycles that will pass before the return data reaches the TXPC read data reordering function 1226.

FIG. 44 is a functional block diagram of the TXPC read data reordering function 1226. It includes an array 1410 of data reordering queues 1412 containing 32 queues, one corresponding to each data read port of the memory. Each of the data reordering queues 1412 contains four entries, each sufficient to hold one data unit. The data reordering queue has two data write ports and one data read port, and while the reading of data occurs sequentially, the writing of data into any of the four entries of a queuing 1412 is random based on the sequence number of the return data. In one embodiment, all the data reordering queues 1412 are implemented in a common return data memory having four segments of 32 entries each. The four segments correspond to the four entries in the individual queues 1412. Each data reordering queue 1412 also has associated therewith a valid vector 1414 and an end of packet (EOP) vector 1416, each of which has four bits corresponding to the four entries in the queue in 1412. Data units returned from the data return crossbar switch 1212 on the lower data return path 1218L are provided to one data write port of all of the data reordering queues 1412 in common. Data units returned from the data return crossbar switch 1212 on the upper data return path 1218U are provided to the other data write port of all of the data reordering queues 1412 in common. The MSBs accompanying each of the return data paths are provided to bank enqueuing logic 1418 in the TXPC read data reordering function 1226.

The bank enqueuing logic 1418 includes a bank counter which cycles through the numbers 0 . . . 15 in coordination with the rotation counter 1222 (FIG. 12). Based on this count and the MSBs returned from the data return crossbar switch 1212, the bank enqueuing logic 1418 enables the correct data write port(s) of the correct data reordering queue(s) 1412 for accepting the return data. In particular, when the bank counter in bank enqueuing logic 1418 outputs a number j, the logic will enable the low port of data reordering queue 1412-$j$ if the returned MSB for the low data return path is 0, or it will enable the low port of data reordering queue 1412-($j$+16) if the returned MSB for the low data return path is 1. Similarly, the logic will enable the upper port of data reordering queue 1412-$j$ if the returned MSB for the upper data return path is 0, or it will enable the upper port of data reordering queue 1412-($j$+16) if the returned MSB for the upper data return path is 1. In this way, the return MSBs act as group member source of indicators indicating the bank member 817 of the group 816 from which each data unit was retrieved. The entry number (0 . . . 3) at which the return data on each path 1218 will be written into the selected data reordering queue is given by the sequence number from the appropriate per-request return FIFO 1228. In addition, the apparatus sets the bit in a valid vector 1414 corresponding to each entry of each of the data reordering queues 1412 into which a data unit is written. It will be appreciated that the enqueuing function of the TXPC read data reordering function 1226 can be generalized in much the same manner as the dequeuing function of the TXPC read address generator 1224, and the dequeuing function of the RXPCs 140.

The TXPC read data reordering function 1226 also includes bank dequeuing logic 1420. This unit includes a counter which is loaded for each block of data returned from the memory 114, from the head of a transmit return FIFO 1422. This FIFO contains the block information from the TXPC block address queuing scheduler 1230 (FIG. 12). Such block information specifies a memory bank 617, and therefore the data reordering queue 1412, at which each returning block of data begins. The bank dequeuing logic 1420 increments its counter eight times to designate the eight sequential ones of the data reordering queues 1412 for dequeuing. If the counter wraps around from 31 to 0, then bank dequeuing logic 1420 notifies the MMU 128 of an end-of-buffer touch. When a queue 1412 is designated for dequeuing, the data unit at the head of the identified queue 1412 is provided through multiplexer 1424 into a transmit FIFO 1426 which provides data units out through the fabric output port 124.

The bank dequeuing logic 1420 also receives the valid bit from the vector 1414 corresponding to each of the data reordering queues 1412. If the bank counter in bank dequeuing logic 1420 indicates a queue 1412 for which the valid bit corresponding to the head of the queue is not set, then the bank dequeuing logic 1420 simply waits until it is set. In this way, the valid bits 1412 prevent the dequeuing operation from running ahead of the filling operation. Additionally, the bank dequeuing logic 1420 receives the end of packet bit from the vector 1416 corresponding to each of the data reordering queues 1412. If set, this bit indicates that the packet has ended before the end of the current block. Accordingly, if the bank counter indicates a queue 1412 for which the end of packet bit corresponding to the head of the queue is set, then the bank dequeuing logic 1420 stops dequeuing further data units for the current block and goes on to the block information indicated in the next entry of the transmit return FIFO 1422. Bank dequeuing logic 1420 also indicates an end-of-packet touch of the current buffer to the MMU when it detects an end-of-packet bit set.

The transmit return FIFO 1422, as mentioned, includes a block starting bank number, the block length, the sequence number for the first bank of the block, and other header information. The other header information is used by a header generator 1428, when and if appropriate, for insertion into the transmit FIFO 1426 via the multiplexer 1424.

Odd/Even Buffer Linkage

With reference to FIGS. 1 and 3, as previously mentioned, each of the TXPCs 142 notifies the MMU 128 of a buffer "touch" whenever it reaches the end of a buffer and whenever it reaches the end of the data packet. Like other data paths with which the TXPCs 142 interfaces with the remainder of the fabric, the communication paths between the TXPCs 142 and the MMU 128 are time domain multiplexed, with each TXPC 142 allocated one clock in each cycle of 16. In many cases, where outgoing data packets are at least 16 data units in length (at least 128 bytes each), then at least 16 clock cycles will elapse after each end-of-packet buffer touch before the TXPC 142 needs to notify the MMU 128 of the next end-of-packet buffer touch. The data rate of one touch notification every 16 clock cycles is therefore sufficient for that situation. If the outgoing data packets are shorter than 16 data units each, or if an end-of-buffer is reached just before or just after an end-of-packet is reached, then it will be appreciated that a bandwidth of one notification per 16 clock cycles will not be sufficient. If the touch notification bandwidth is insufficient to keep up with notifications generated by a TXPC, then the TXPC 142 transit FIFO 1426 (FIG. 14) could starve and degrade the throughput of the fabric.

The embodiment of FIG. 1 avoids this problem in a manner that allows full throughput for data packets as short as eight data units (64 bytes) each, even if an end-of-buffer occurs within the 64-byte packet. Shorter data packets are permitted, but they are not guaranteed full throughput. According to the embodiment, the buffers 118 of the memory 114 are divided into two sets. In the present embodiment, the sets are referred to as even and odd, and all even-numbered buffers 118 belong to the even set and all odd-numbered buffers 118 belong to the odd set. In another embodiment, the buffers can be divided differently. Also in another embodiment, the buffers can be divided into more than two sets. Further, when an RXPC 140 requests free buffer numbers from the MMU 128, it always receives back two at a time, one from the even set and one from the odd set, and it always uses the buffers in alternating even and odd sequence, i.e., if a packet straddles two buffers 118, then one buffer will always be in the even set and the other buffer will always be in the odd set. The communication path by which the MMU 128 communicates free buffer numbers to each RXPC 140 is wide enough to carry the two buffer numbers allocated simultaneously.

Several of the memories in the MMU 128 are implemented in such a way as to achieve the desired touch notification rate. FIG. 15 is a diagram illustrating these implementations. Referring to FIG. 15, it can be seen that the list of free buffers 414 is implemented as two memory arrays, one array 414A containing only free even buffer numbers and the other array 414B containing only tree odd buffer numbers. When a TXPC touch notification causes the release of a buffer 118, the newly free buffer number is written into the appropriate one of the arrays 414A and 414B, depending on whether the buffer number is even or odd. When an RXPC 140 free buffer number prefetch FIFO 1020 requests new free buffer numbers, the MMU provides them two at a time, one from each of the arrays 414A and 414B.

The MMU 128 as shown in FIG. 15 also shows the buffer status store 408 as being divided into two buffer status stores 408A and 408B, for even and odd buffer numbers, respectively. The data path by which a TXPC 142 can notify the MMU 128 of buffer touches is now wide enough to accommodate up to two buffer touch notifications at a time, one for an even-numbered buffer and one for an odd-numbered buffer. The division of buffer status store 408 therefore permits it to update buffer status information in both buffer status stores 408A and 408B concurrently. As used herein, the accessing of two stores "concurrently" means in a manner that overlaps in time to such an extent that the total access time is shorter than it could be if the accesses were made to a single store sequentially. Exact simultaneity is not required.

As with the unitary buffer status store 408, each buffer status store 408A or 408B is implemented with a buffer usage counter array 410A or 410B, to keep track of the buffer usage counts for the even or odd buffers, respectively, and buffer release counter arrays 412A and 412B, to keep track of the buffer release counts for the even and odd buffers, respectively. If an RXPC 140 notifies the MMU 128 of a buffer usage count, the MMU 128 writes the count into the appropriate one of its buffer usage counter arrays 410A or 410B, depending on the buffer number. If a TXPC 142 notifies the MMU 128 of a buffer touch, the MMU increments the count for the designated buffer in the appropriate one of its buffer release counter arrays 412A or 412B, again depending on the buffer number.

The buffer linkage list 416 in the MMU 128 is not divided by even and odd buffer numbers but, in order to keep up with the data rate at which TXPCs 142 can request next linked buffer numbers, the buffer linkage list 416 is implemented as a two read port/two write port memory. A fixed subset of eight of the TXPCs 142 (for example TXPCs 142-0 through 142-7) are connected so as to share one of the read ports, whereas another fixed subset of the TXPCs 142 (for example TXPCs 142-8 through 142-15) are connected so as to share the other read port. Similarly, one fixed subset of eight of the RXPCs 140 are connected so as to share one of the data write ports, whereas another fixed subset of the RXPCs 140 are connected to share the other data write port. The cyclical trace memories 418 are not enhanced in the present embodiment because there is no urgency for reading and writing to these memories.

With respect to the buffer usage counter arrays 410A and 410B, a single RXPC 140 does not need to write usage counts into either buffer usage counter list more frequently than the frequency with which it can fill a buffer 118. Since an RXPC 142 cannot fill a single buffer 118 in less than 16 clock cycles, and since there are 16 TXPCs 140, the writing bandwidth for the buffer usage counter list 410 does not need to exceed one write in every clock cycle. On the transmit side, however, in order to accommodate 64-byte packets at full throughput, each TXPC 142 has to be able to notify the MMU 128 of two end-of-packet buffer touches as frequently as once every 16 clock cycles (that is, as frequently as one end-of-packet buffer touch per eight clock cycles). Thus, since there are 16 TXPCs 142, the buffer release counter list 412 must be able to handle at least two touches per clock. In addition, this throughput requirement must be doubled to accommodate situations in which end-of-buffers occur very shortly before or after end-of-packets, such as where 64-byte packets straddle two buffers. In this situation, the TXPC might have to communicate up to four touch notifications per 16 clocks, doubling the worst case touch notification bandwidth requirement of the buffer release counter list 412 to four touches per clock. Moreover, the throughput requirement of the buffer release counter list 412 is doubled yet again since each buffer touch requires two accesses in a read-modify-write operation. Thus, the buffer release counter list 412 must be able to handle at least eight accesses per clock cycle in order to guarantee full throughput at 64 bytes per packet.

The odd/even division of buffer numbers in the memory 814 plays an important role in alleviating this problem. Since sequential buffer touches occurring as frequently as two per eight clock cycles are required to alternate even with odd buffer numbers, the division of the buffer release counter lists into even and odd arrays 412A and 412B divides the buffer throughput requirement of each array in half. The remainder of the throughput is achieved by using a 4-port (two read/two write port) memory for the buffer release counter arrays and the buffer usage counter arrays. FIG. 16 is a functional block diagram illustrating how the buffer status store 408A for even buffer numbers can be implemented. The buffer status store 408B for odd buffer numbers is similar. For clarity of illustration and discussion, the diagram of FIG. 16 omits certain implementation features such as pipelining.

Referring to FIG. 16, the buffer numbers and corresponding usage counts from eight of the RXPCs 140-0 through 142-7 are provided through a multiplexer 1610 to the first data write port of the even buffer usage counter array 410A. The buffer numbers and corresponding usage counts from the other eight RXPCs 140-8 through 140-15 are provided through a multiplexer 1612 to the second data write port of the even buffer usage counter array 410A. In each case, the buffer numbers are provided to the address part and the buffer usage count is provided to the data part of the respective data write port. Similarly, the buffer numbers of touch notifications from eight of the TXPCs 142-0 through 142-7 are provided through multiplexer 1614 to the address part of a first data read port of the even buffer usage counter array 410A, and the buffer numbers of touch notifications from the other eight TXPCs 142-8 through 142-15 are provided through multiplexer 1616 to the address part of a second data read port of the even buffer usage counter array 410A.

Each buffer number provided to the address part of the first data read port of even buffer usage counter array 410A is also provided to the address part of a first data read port of an even buffer release counter array 412A, and to the address part of a first data write port of even buffer release counter array 412A. Similarly, each buffer number provided to the address part of the second data read port of even buffer usage counter array 410A is also provided to the address part of a second data read port of even buffer release counter array 412A, and to the address part of a second data write port of even buffer release counter array 412A.

The data part of the first data read port of even buffer usage counter array 410A and the data part of the first data read port of even buffer release counter array 412A are provided to respective inputs of a buffer release comparator 1618, which determines whether the two count values are equal. The data part of the first data read port of even buffer release counter array 412A is also provided to modify logic 1620, as is the equality output of buffer release comparator 1618. Modify logic 1620 either increments the count from the data part of the first data read port of even buffer release counter array 412A, or clears it if the equality output of buffer release comparator 1618 is asserted. The output of modify logic 1620 is provided to the data part of the first data write port of even buffer release counter array 412A.

Similarly, the data part of the second data read port of even buffer usage counter array 410A and the data part of the second data read port of even buffer release counter array 412A are provided to respective inputs of another buffer release comparator 1622, which determines whether the two count values are equal. The data part of the second data read port of even buffer release counter array 412A is also provided to modify logic 1624, as is the equality output of buffer release comparator 1622. Modify logic 1624 either increments the count from the data part of the second data read port of even buffer release counter array 412A, or clears it if the equality output of buffer release comparator 1622 is asserted. The output of modify logic 1624 is provided to the data part of the second data write port of even buffer release counter array 412A.

Buffer numbers being addressed at the first and second data read ports of even buffer usage counter array 412A are also provided to buffer release logic 1626, as is the equality output of each of the buffer release comparators 1618 and 1622. The buffer release logic 1626 generates release buffer signal(s) indicating the buffer number(s) that are the subject of touch notifications by the TXPCs 142 and for which the buffer release comparator 1618 or 1622 asserted equality.

In operation, the RXPCs 140 write buffer usage counts through the multiplexers 1610 and 1612 into the even buffer usage counter array 410A as needed. From the TXPCs 142, touch notification buffer numbers are used to read out both the buffer usage count for the designated buffer number from even buffer usage counter array 410A and the current value of the buffer release count for the designated buffer number from the even buffer release counter array 412A. The two count values are compared by the buffer release comparator 1618 or 1622, as the case may be, and if they are equal, then buffer release logic 1626 causes the MMU 128 to release the buffer number as previously described. The comparator 1618 or 1622 also forces the modify logic 1620 or 1624, as the case may be, to write a cleared count value into the even buffer release counter array 412A at the address corresponding to the newly freed buffer number. If the two count values are not equal, then the current buffer release count read from the even buffer release counter array 412A is incremented by the modify logic 1620 or 1624 and written back into the same location in the even buffer release counter array 412A.

The flowcharts of FIGS. 2, 3, 5A, 5B, 5D and 5E are modified as follows in order to implement the even/odd division of the buffers 118. In the RXPCs 140, in step 210 (FIG. 2), the MMU 128 allocates not one, but two starting free buffer numbers: one even and one odd. One of these becomes the current buffer number. The RXPC free buffer number prefetch FIFO 1020 (FIG. 10) still holds four free buffer numbers, but they will alternate even with odd.

In the TXPCs 142, when a TXPC 142 pre-requests each next linked buffer number from the MMU (step 314 in FIG. 3), the MMU 128 still provides only one next buffer number at a time. It does so, however, from a single buffer linkage list 416 that has 2 read ports and 2 write ports. TXPCs 142-0 through 142-7 are arbitrarily assigned to all use one read port while TXPCs 142-8 through 142-15 are arbitrarily assigned to all use the other read port. In step 320, when the TXPC 142 notifies the MMU 128 of a buffer touch, it does so on its "even" buffer touch notification bus if the current buffer number is even, and on its "odd" buffer touch notification bus if the current buffer number is odd.

In the MMU 128, upon receipt of a free buffer number request from an RXPC 140 (FIG. 5A), the MMU reports to the requesting RXPC 140 not the buffer number at the front of a single free buffer list 414, but the buffer numbers at the front of each of the even and odd arrays of free buffers 414A and 414B. It also moves the allocated buffer numbers from both of such arrays to the end of the cyclical trace memory 418 for buffers allocated to this RXPC 140.

Buffer usage count reports from an RXPC 142 (FIG. 5B) are received by the MMU 128 on either the RXPC's even bus or odd bus to the MMU. The MMU 128 accordingly writes the packet usage count from the RXPC 140 into the buffer usage counter array 410A or 410B at the location of the specified buffer number, depending on the bus on which the MMU 128 received report.

Buffer touch notifications from a TXPC 142 (FIG. 5D), too, are received by the MMU 128 on either the TXPC's even or odd bus to the MMU. The MMU 128 then performs the functions of a touch notification, as described above with respect to FIG. 16, on either the even or odd buffer usage and release stores, depending on the bus on which the MMU 128 received the touch notification.

Upon receipt of a buffer scrub command from an external controller (FIG. 5E), the MMU scrub logic still loops through all buffer numbers. It does not search even and odd buffer numbers simultaneously, since that speed is unimportant in this operation. For each buffer number, the scrub logic searches for that buffer number in the even or odd array of free buffers, as the case may be, and all the trace memories. If not found, then if the current buffer number is even, the scrub logic watches the even release comparators 1618 and 1622 for the watch period for possible release of the buffer by a TXPC 142. If the current buffer number is odd, the scrub logic watches the odd release comparators (not shown) in the odd buffer status store 408B. If the current buffer number is still not found, then MMU 128 reclaims the buffer by writing the buffer number onto the end of the even or odd free buffer array 414A or 414B, as the case may be. It then loops back to check for the next buffer number.

As used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

It is to be understood that the embodiments and variations shown and described herein are merely illustrative of the principles of this invention and that various modifications may be implemented by those skilled in the art without departing from the scope and spirit of the invention. For example, wherever information is shown or described herein as being carried on separate busses or conductors, in another embodiment the same information can be encoded or multiplexed together to be carried on one or more common buses or conductors. As another example, any or all of the lists and memories shown in FIGS. 4 and 15 as being disposed within an MMU 128, in another embodiment some or all of them can be located within different functional units of the switching fabric, or could be spread among them. As yet another example, whereas the write request crossbar switch 134 combines pairs of data write requests for routing as a unit through the switch 134, another embodiment might route such data write requests independently. The same is true for the read address crossbar switch 1210 and the data return crossbar switch 1212. The embodiments described herein were chosen and described in order to best explain the principles of the invention and its practical application, thereby enabling others skilled in the art to understand the invention for various embodiments and with various modifications as are suited to the particular use contemplated.

We claim:

1. A method for managing a shared memory in a packet switch, said shared memory comprising one or more buffers, said method comprising the step of: maintaining a buffer usage count for at least one of said buffers, wherein said buffer usage count provides an indication of a sum over all packets in said at least one of said buffers of a number of output ports toward which each of said packets is destined, wherein said at least one of said buffers contains two or more packets and wherein at least one of said two or more packets is destined for more than one output port; and adding said at least one of said buffers to a free buffer list if a release of said at least one of said buffers does not occur within a predefined period of time.

2. The method of claim 1, further comprising the step of incrementing said buffer usage count by one to indicate that a packet destined for one output port is stored in said buffer.

3. The method of claim 1, further comprising the step of decrementing said buffer usage count by one when a data unit is read from said buffer and said data unit is the last data unit of a packet or the last data unit of said buffer.

4. The method of claim 1, wherein said buffer usage count indicates a number of destination ports for a packet to perform a multicasting operation.

5. The method of claim 1, further comprising the step of determining whether a buffer is free based on said buffer usage count.

* * * * *